US008284135B2

(12) United States Patent
Minami et al.

(10) Patent No.: US 8,284,135 B2
(45) Date of Patent: Oct. 9, 2012

(54) DISPLAY APPARATUS AND ELECTRONIC INSTRUMENT

(75) Inventors: Tetsuo Minami, Tokyo (JP); Katsuhide Uchino, Kanagawa (JP)

(73) Assignee: Sony Corporation, Tokyo (JP)

(*) Notice: Subject to any disclaimer, the term of this patent is extended or adjusted under 35 U.S.C. 154(b) by 260 days.

(21) Appl. No.: 12/725,972

(22) Filed: Mar. 17, 2010

(65) Prior Publication Data

US 2010/0245324 A1 Sep. 30, 2010

(30) Foreign Application Priority Data

Mar. 25, 2009 (JP) ................................ 2009-073977

(51) Int. Cl.
G06F 3/038 (2006.01)

(52) U.S. Cl. ........................................ 345/82; 345/208

(58) Field of Classification Search ............. 345/76-82, 345/204, 208-213; 315/169.1-169.3; 359/249
See application file for complete search history.

(56) References Cited

U.S. PATENT DOCUMENTS

| | | | | |
|---|---|---|---|---|
| 2008/0030436 | A1* | 2/2008 | Iida et al. | 345/77 |
| 2008/0231625 | A1* | 9/2008 | Minami et al. | 345/212 |
| 2009/0207160 | A1* | 8/2009 | Shirasaki et al. | 345/212 |

FOREIGN PATENT DOCUMENTS

JP 2008-033193 2/2008

* cited by examiner

*Primary Examiner* — Liliana Cerullo
(74) *Attorney, Agent, or Firm* — SNR Denton US LLP

(57) ABSTRACT

A display apparatus includes: a plurality of pixel circuits; and a signal supply circuit which supplies any one of a potential of a video signal, an extinction potential for extinguishing light-emitting devices, and a high-level potential higher than the extinction potential, wherein each of the plurality of pixel circuits includes a storage capacitor which retains a voltage corresponding to the video signal, a drive transistor which supplies a current based on the voltage retained in the storage capacitor to the corresponding light-emitting device, a light-emitting device which emits light in accordance with the current supplied from the drive transistor, and a write transistor which writes the voltage corresponding to the video signal to the storage capacitor after the potentials supplied by the signal supply circuit in order of the high-level potential and the extinction potential are given to the gate terminal of the drive transistor.

6 Claims, 20 Drawing Sheets

FIG.6A TP8
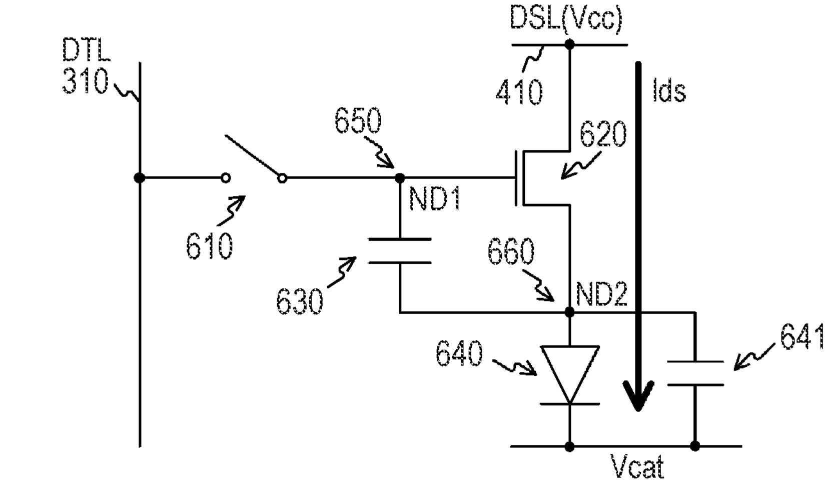
FIG.6B TP1
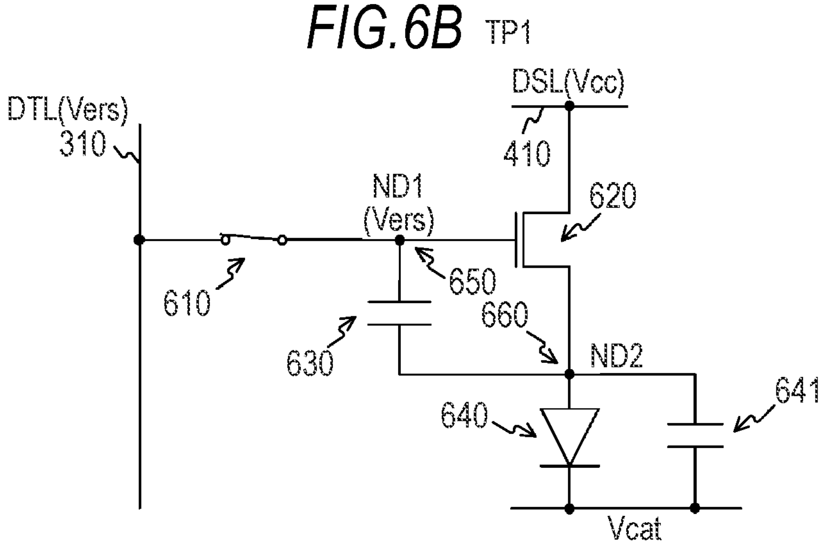
FIG.6C TP2
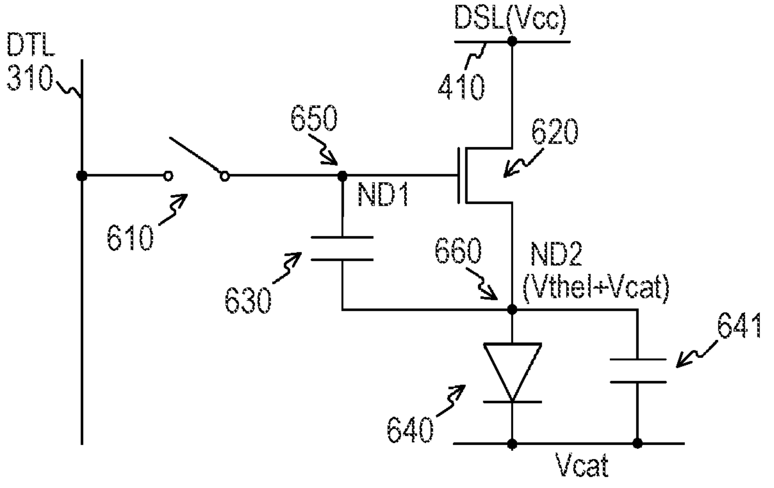

FIG.7A TP3
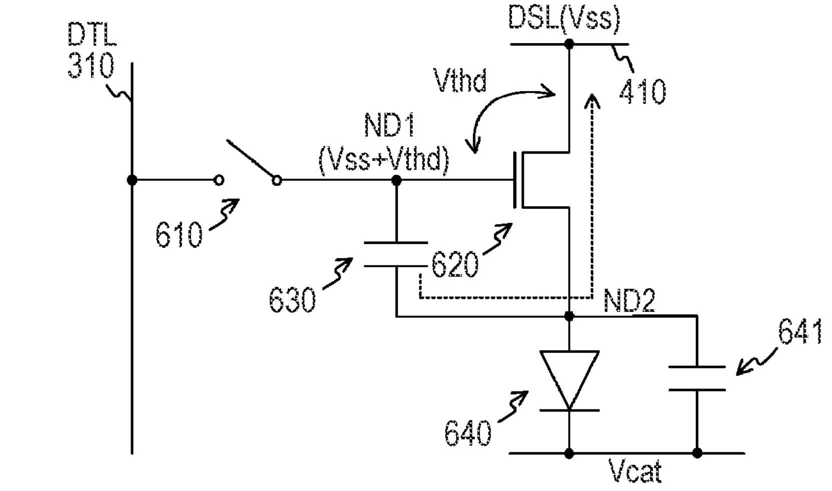
FIG.7B TP4
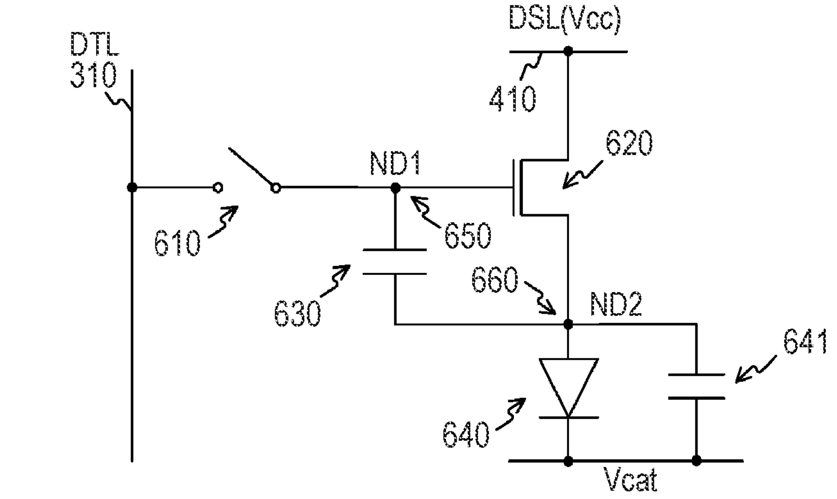
FIG.7C TP5
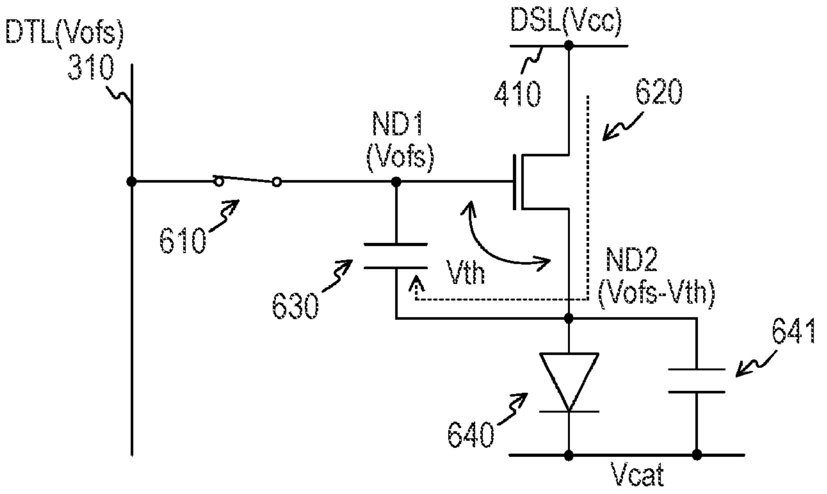

FIG.8A TP6
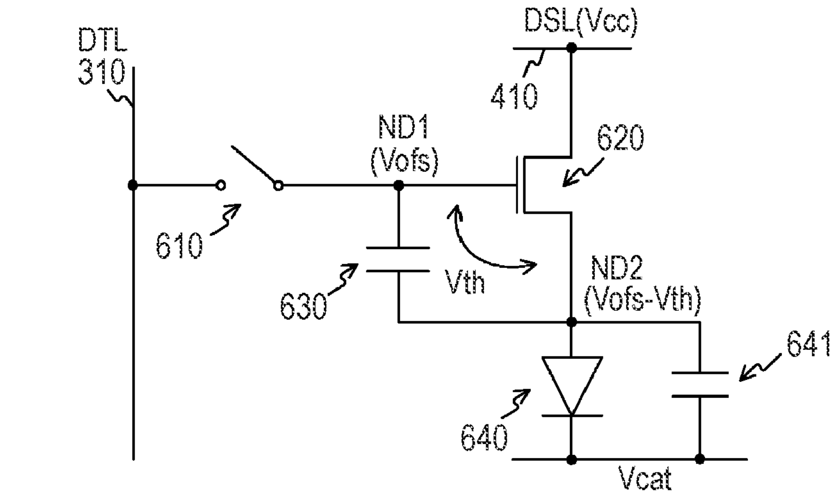
FIG.8B TP7
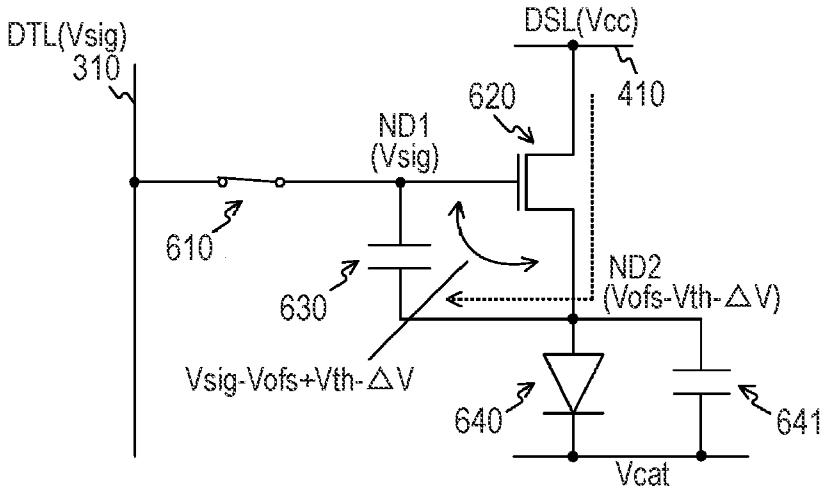
FIG.8C TP8
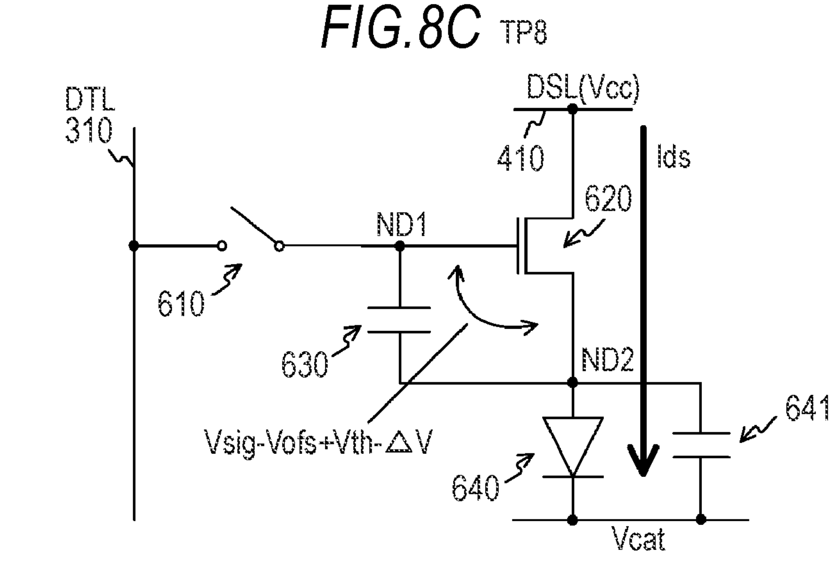

FIG.14

720

| | CURRENT CHARACTERISTIC (CURRENT VALUE AT THE TIME OF START OF EXTINCTION PERIOD) | |
|---|---|---|
| | CURRENT SMALL (1.00) | CURRENT LARGE (1.25) |
| 711 INTEGRATION VALUE OF FIRST ROW | 229.4 | 332.2 |
| 712 INTEGRATION VALUE OF 48TH ROW | 214.2 | 316.8 |
| 713 DIFFERENCE RATIO | 6.6% | 4.7% |

DISPLAY APPARATUS AND ELECTRONIC INSTRUMENT

BACKGROUND OF THE INVENTION

1. Field of the Invention

The present invention relates to an electronic instrument, and in particular, to a display apparatus using light-emitting devices for pixels and an electronic instrument including the display apparatus.

2. Description of the Related Art

In recent years, a planar self-luminous type display apparatus has been actively developed in which an organic electroluminescence (EL) device is used as a light-emitting device. The organic EL device emits light when an electric field is applied to an organic thin film. The organic EL device is of a low-voltage drive type, so good visibility is achieved. This is expected to contribute to reduction in weight and thickness or low power consumption of the display apparatus.

In a display apparatus using the organic EL device, the electric field applied to the organic thin film is controlled by a drive transistor constituting a pixel circuit. On the other hand, there are variations in threshold value and mobility between drive transistors. For this reason, there are demands for threshold correction processing and mobility correction processing so as to correct the variations. Thus, a display apparatus having such correction functions has been contrived. For example, a display apparatus has been suggested which has a function for correcting the variations in threshold voltage and mobility between drive transistors constituting pixel circuits by switching power supply signals and data signals supplied to the pixel circuits (for example, see JP-A-2008-33193 (FIG. 4A)).

SUMMARY OF THE INVENTION

In the related art, the variations in threshold voltage and mobility between the drive transistors constituting the pixel circuits can be corrected. In this case, to switch power supply signals, a driver for switching power supply signals should be provided for each row, which causes an increase in cost of the display apparatus. In contrast, the number of drivers is reduced by switching power supply signals for every plural number of rows. However, in such a configuration, a light-emitting device is extinguished without depending on switching of power supply signals, so it takes a lot of time to completely extinguish the light-emitting device due to the effect of parasitic capacitance of the light-emitting device or the like. In such a case, gradation may occur in a display image.

It is desirable to reduce gradation in a display image.

A first embodiment of the invention provides a display apparatus and an electronic instrument. The display apparatus and the electronic instrument include a plurality of pixel circuits, and a signal supply circuit which supplies any one of a potential of a video signal, an extinction potential for extinguishing a light-emitting device, and a high-level potential higher than the extinction potential. Each of the plurality of pixel circuits includes a storage capacitor which retains a voltage corresponding to the video signal, a drive transistor which supplies a current based on the voltage retained in the storage capacitor to the corresponding light-emitting device, a light-emitting device which emits light in accordance with the current supplied from the drive transistor, and a write transistor which writes the voltage corresponding to the video signal to the storage capacitor after the potentials supplied by the signal supply circuit in order of the high-level potential and the extinction potential are given to the gate terminal of the drive transistor. Therefore, the potential at the input terminal of the light-emitting device can be increased through the storage capacitor after the potentials supplied by the signal supply circuit in order of the high-level potential and the extinction potential are given to the gate terminal of the drive transistor.

The display apparatus of the first embodiment may further include a power supply circuit which supplies the same power supply potentials to the plurality of pixel circuits for every plural number of rows. The drive transistor may supply to the light-emitting device the current based on the voltage retained in the storage capacitor by receiving the power supply potential. Therefore, the same power supply potential may be supplied to every plural number of rows of pixel circuits.

In the first embodiment, the signal supply circuit may supply the high-level potential within the range of the potential of the video signal. Therefore, the high-level potential can be supplied within the range of the potential of the video signal. In this case, the signal supply circuit supplies the high-level potential within the range lower than half of the range of the potential of the video signal. Therefore, the high-level potential can be supplied within the range lower than half of the range of the potential of the video signal.

In the first embodiment, the light-emitting devices may be organic electroluminescence devices. Therefore, light can be emitted from the organic electroluminescence devices.

According to the embodiment of the invention, an excellent effect is obtained in that gradation in a display image is reduced.

BRIEF DESCRIPTION OF THE DRAWINGS

FIGS. 6A to 6C are circuit diagrams schematically showing operation states of the pixel 600 corresponding to periods TP8, TP1, and TP2, respectively.

FIGS. 7A to 7C are circuit diagrams schematically showing operation states of the pixel 600 corresponding to periods TP3 to TP5, respectively.

FIGS. 8A to 8C are circuit diagrams schematically showing operation states of the pixel 600 corresponding to periods TP6 to TP8.

FIG. 14 is a diagram showing a comparison result of integration values in current characteristics 661 and 662 shown in FIG. 13B.

DETAILED DESCRIPTION OF THE INVENTION

A mode for carrying out the invention (hereinafter, referred to as embodiment) will now be described. The description will be made in the following sequence.

1. First Embodiment (display control: potential of extinction preparation signal is added to data signal)
2. Second Embodiment (display control: application to electronic instrument)

<1. First Embodiment>

[Example of Basic Configuration of Display Apparatus]

Figure 1:
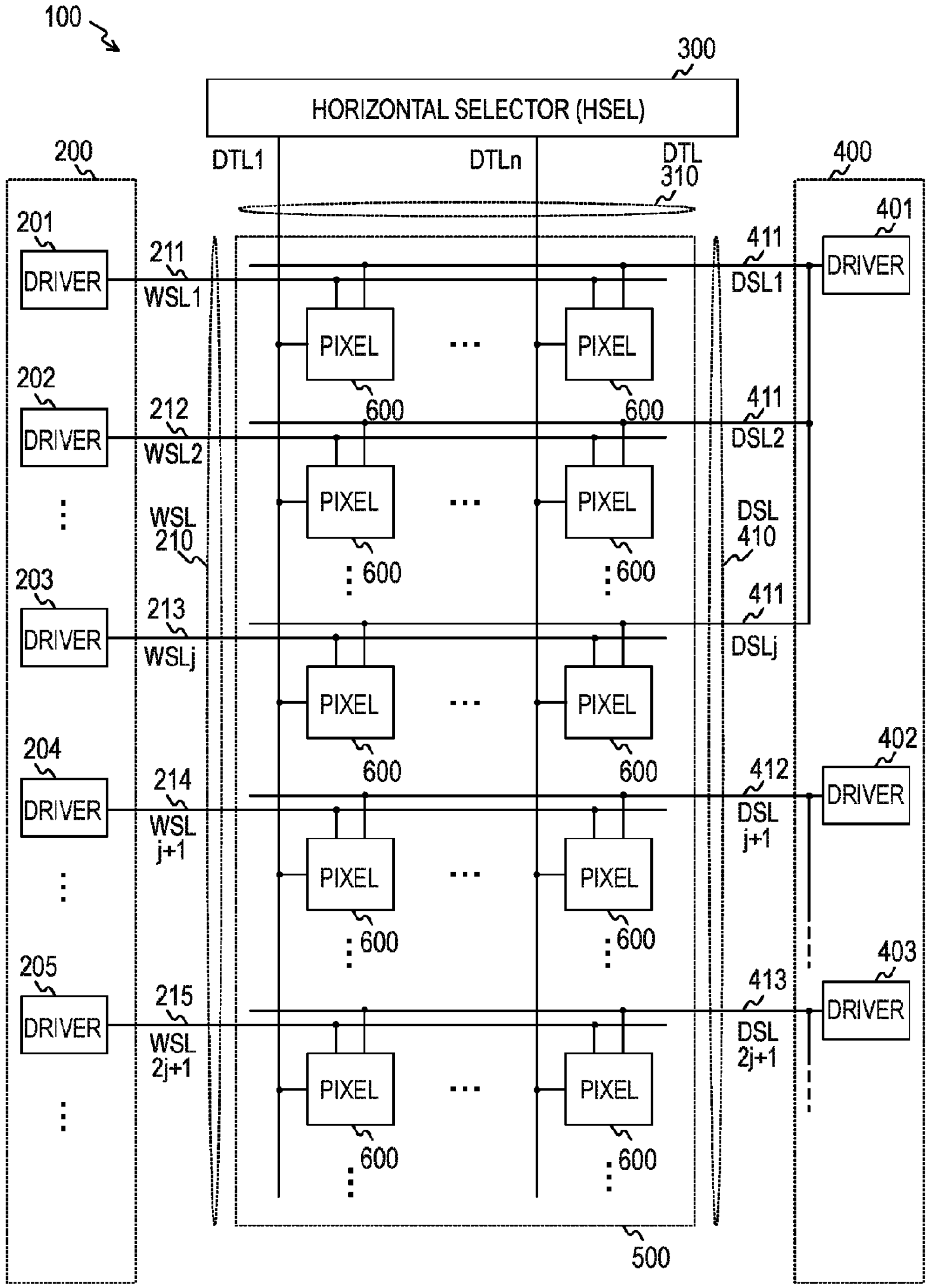
FIG. 1 is a conceptual view showing an example of the basic configuration of a display apparatus to which an embodiment of the invention is applied.

FIG. 1 is a conceptual view showing an example of a basic configuration of a display apparatus to which an embodiment of the invention is applied.

A display apparatus 100 includes a write scanner (WSCN: Write SCaNner) 200, a horizontal selector (HSEL: Horizontal SELector) 300, and a drive scanner (DSCN: Drive SCaNner) 400. The display apparatus 100 also includes a pixel array unit 500. The pixel array unit 500 includes a plurality of pixels 600 arranged in a two-dimensional n×m matrix. The display apparatus 100 is also provided with write scan lines (WSL) 210, data lines (DTL) 310, and drive scan lines (DSL) 410.

The write scan lines (WSL) 210 and the drive scan lines (DSL) 410 are formed for the respective rows of pixels 600, and are respectively connected to the write scanner (WSCN) 200 and the drive scanner (DSCN) 400. The data lines (DTL) 310 are formed for the respective columns of pixels 600, and are connected to the horizontal selector (HSEL) 300. The write scan lines (WSL) 210, the data lines (DTL) 310, and the drive scan lines (DSL) 410 are respectively connected to the pixel 600.

The write scanner (WSCN) 200 line-sequentially scans the plurality of pixels 600 arranged in a two-dimensional matrix. The write scanner (WSCN) 200 writes data signals supplied from the data lines (DTL) 310 to the pixels 600 in terms of rows. That is, the write scanner (WSCN) 200 sequentially controls write timing of the data signals from the data lines (DTL) 310 to the pixels 600 in terms of rows.

The write scanner (WSCN) 200 generates a control signal for sequentially controlling the timing at which the data signals are written. The write scanner (WSCN) 200 generates an on potential for writing data signals and an off potential for stopping writing of data signals as the control signal. The write scanner (WSCN) 200 generates, as the off potential, a first off potential for causing the pixels 600 to emit light and a second off potential for preventing current leakage from the data lines (DTL) 310 due to initialization of the pixels 600. That is, the write scanner (WSCN) 200 generates any one of the on potential, the first off potential, and the second off potential as the control signal. The write scanner (WSCN) 200 supplies the generated control signal to the write scan line (WSL) 210.

The write scanner (WSCN) 200 includes drivers 201 to 205 corresponding to the rows of pixels 600. Each of the drivers 201 to 205 generates a control signal for writing data signals supplied from the data lines (DTL) 310 for the pixels 600 of the corresponding row. The drivers 201 to 205 respectively supply the generated control signals to the write scan lines (WSL) 211 to 215.

The horizontal selector (HSEL) 300 selects any one of a potential of a video signal, a potential of a reference signal for correction of the threshold voltage of a drive transistor constituting each pixel 600 (threshold correction), and a potential (extinction potential) of an extinction signal for extinguishing the pixel 600. That is, the horizontal selector (HSEL) 300 selects any one of the video signal, the reference signal, and the extinction signal. The horizontal selector (HSEL) 300 supplies the selected signal to the data line (DTL) 310 as a data signal. The horizontal selector (HSEL) 300 switches a data signal on the basis of line-sequential scanning by the write scanner (WSCN) 200.

The drive scanner (DSCN) 400 sequentially supplies the same power supply signal for every plural number of rows (j rows: where j is an integer equal to or greater than 2). That is, the drive scanner (DSCN) 400 sequentially supplies a power supply signal for every plural number of drive scan lines (DSL) 410. The drive scanner (DSCN) 400 switches a power supply signal to any one of a power supply potential for supplying a current to the pixels 600 in terms of a predetermined number of rows and an initialization potential for initializing the pixels 600. The drive scanner (DSCN) 400 supplies the power supply signal to the drive scan line (DSL) 410.

The drive scanner (DSCN) 400 includes drivers 401 to 403 for every plural number of rows (j rows). Each of the drivers 401 to 403 generates a power supply signal for a predetermined number of rows of pixels 600. The drivers 401 to 403 supply the generated power supply signals to the drive scan lines (DSL) 411 to 413. The drive scanner (DSCN) 400 is an example of a power supply circuit described in the appended claims.

Each pixel 600 emits light in accordance with a voltage corresponding to a video signal from the data line (DTL) 310 for a predetermined time of period on the basis of a control signal from the write scan line (WSL) 210.

As described above, the drive scanner (DSCN) 400 supplies the same power supply signal for every plural number of rows of pixels 600, so the number of drivers of the drive scanner (DSCN) 400 can be reduced. Therefore, manufacturing costs of the display apparatus 100 can be reduced. Next, an example of the configuration of the horizontal selector (HSEL) 300 will be described with reference to subsequent drawings.

[Example of Configuration of Horizontal Selector]

Figure 2A:
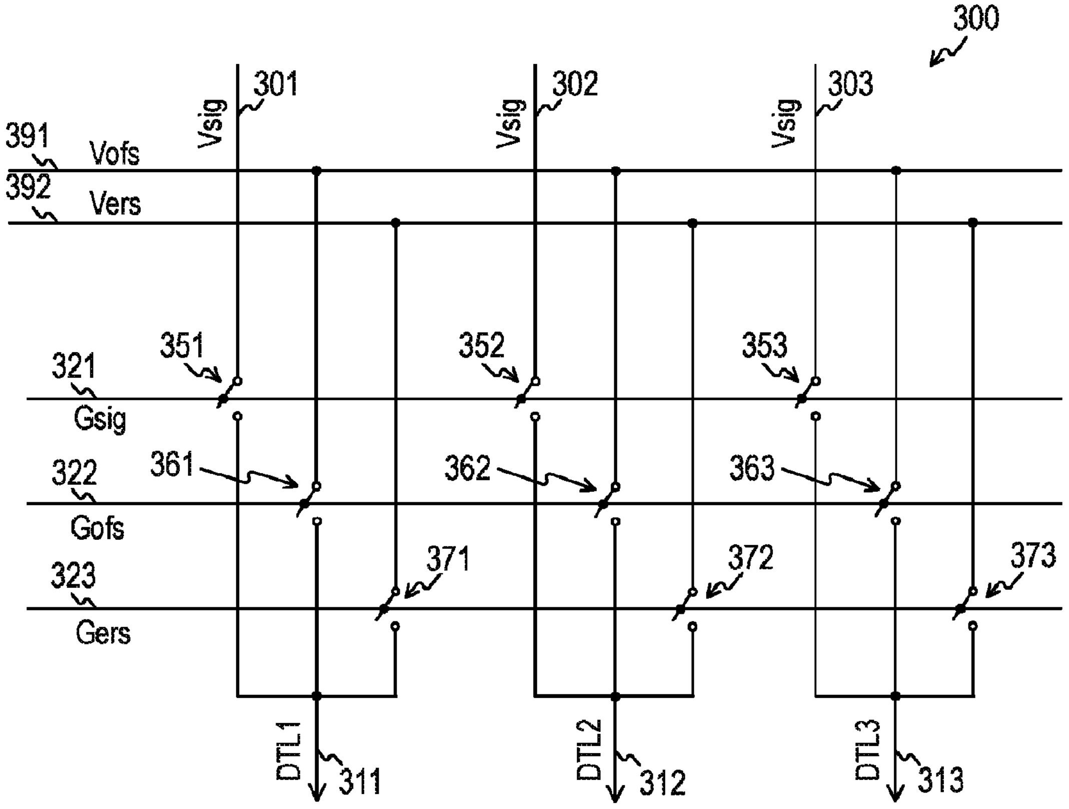
FIGS. 2A and 2B are diagrams showing an example of a method of generating data signals, which are supplied to data lines (DTL) 311 to 313, by a horizontal selector (HSEL) 300 in a display apparatus 100.
Figure 2B:
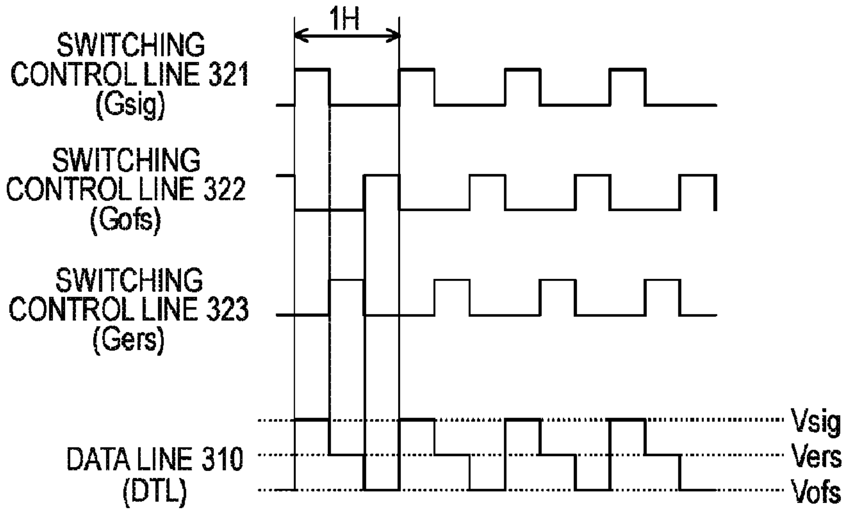

FIGS. 2A and 2B are diagrams showing an example of a method of generating data signals, which are supplied to the data lines (DTL) 311 to 313, by the horizontal selector (HSEL) 300 in the display apparatus 100. FIG. 2A is a block diagram showing an example of the configuration of the horizontal selector (HSEL) 300 in the display apparatus 100. FIG. 2B is a timing chart showing changes in potential of switching control line 321 to 323 and the data line (DTL) 310 in the configuration shown in FIG. 2A.

In FIG. 2A, video signal lines 301 to 303, a reference signal line 391, an extinction signal line 392, switching control lines 321 to 323, switching circuits 351 to 353, switching circuits 361 to 363, and switching circuits 371 to 373 are shown.

A video signal (Vsig) for the respective pixels 600 of each row is supplied to the video signal lines 301 to 303 in a time division manner. A reference signal (Vofs) for correction of the threshold voltage of a drive transistor constituting the pixel 600 (threshold correction) is supplied to the reference signal line 391. An extinction signal (Vers) for extinguishing the pixel 600 is supplied to the extinction signal line 392. A switching control signal (Gsig) for controlling switching of the switching circuits 351 to 353 is supplied to the switching control line 321. A switching control signal (Gofs) for controlling switching of the switching circuits 361 to 363 is supplied to the switching control line 322. A switching control signal (Gers) for controlling switching of the switching circuits 371 to 373 is supplied to the switching control line 323.

The switching circuits 351 to 353 respectively switch connection and disconnection between the video signal lines 301 to 303 and the data lines (DTL) 311 to 313 on the basis of the switching control signal (Gsig) from the switching control line 321. The switching circuits 361 to 363 respectively switch connection and disconnection between the reference signal line 391 and the data lines (DTL) 311 to 313 on the basis of the switching control signal (Gofs) from the switching control line 322. The switching circuits 371 to 373 respectively switch connection and disconnection between the extinction signal line 392 and the data lines (DTL) 311 to 313 on the basis of the switching control signal (Gers) from the switching control line 323.

FIG. 2B shows changes in potential of the switching control lines 321 to 323 and the data line (DTL) 310 with the horizontal axis as a common time axis. Although the potential of the video signal (Vsig) changes depending on a video signal input to the display apparatus 100, in this embodiment, it is assumed that the video signal is at fixed potential. Here, the operation of the horizontal selector (HSEL) 300 during one horizontal scanning period (1H) will be described.

First, immediately before a previous horizontal scanning period ends, the potential of the switching control signal (Gsig) in the switching control line 321 is set at L (Low) level, and the potential of the switching control signal (Gofs) in the switching control line 322 is set at H (High) level. The potential of the switching control signal (Gers) in the switching control line 323 is set at L level.

Next, during one horizontal scanning period, the potential of the switching control signal (Gsig) in the switching control line 321 is changed from L level to H level, and the potential of the switching control signal (Gofs) in the switching control line 322 is changed from H level to L level. Thus, the video signal lines 301 to 303 and the data lines (DTL) 311 to 313 are respectively connected to each other by the switching circuits 351 to 353, such that the video signal (Vsig) is supplied to the data line (DTL) 310 as a data signal.

Next, the potential of the switching control signal (Gsig) in the switching control line 321 is changed from H level to L level, and the potential of the switching control signal (Gers) in the switching control line 323 is changed from L level to H level. Thus, the extinction signal line 392 and the data lines (DTL) 311 to 313 are connected to each other by the switching circuits 371 to 373, such that the extinction signal (Vers) is supplied to the data lines (DTL) 311 to 313 as a data signal.

Next, the potential of the switching control signal (Gers) in the switching control line 323 is changed from H level to L level, and the potential of the switching control signal (Gofs) in the switching control line 322 is changed from L level to H level. Thus, the reference signal line 391 and the data lines (DTL) 311 to 313 are connected to each other by the switching circuits 361 to 363, such that the reference signal (Vofs) is supplied to the data line (DTL) 310 as a data signal.

As described above, a three-value data signal can be generated by using the three switching circuits and the three switching control lines 321 to 323 for every data line (DTL) 310.

[Example of Basic Operation of Display Apparatus]

Figure 3:
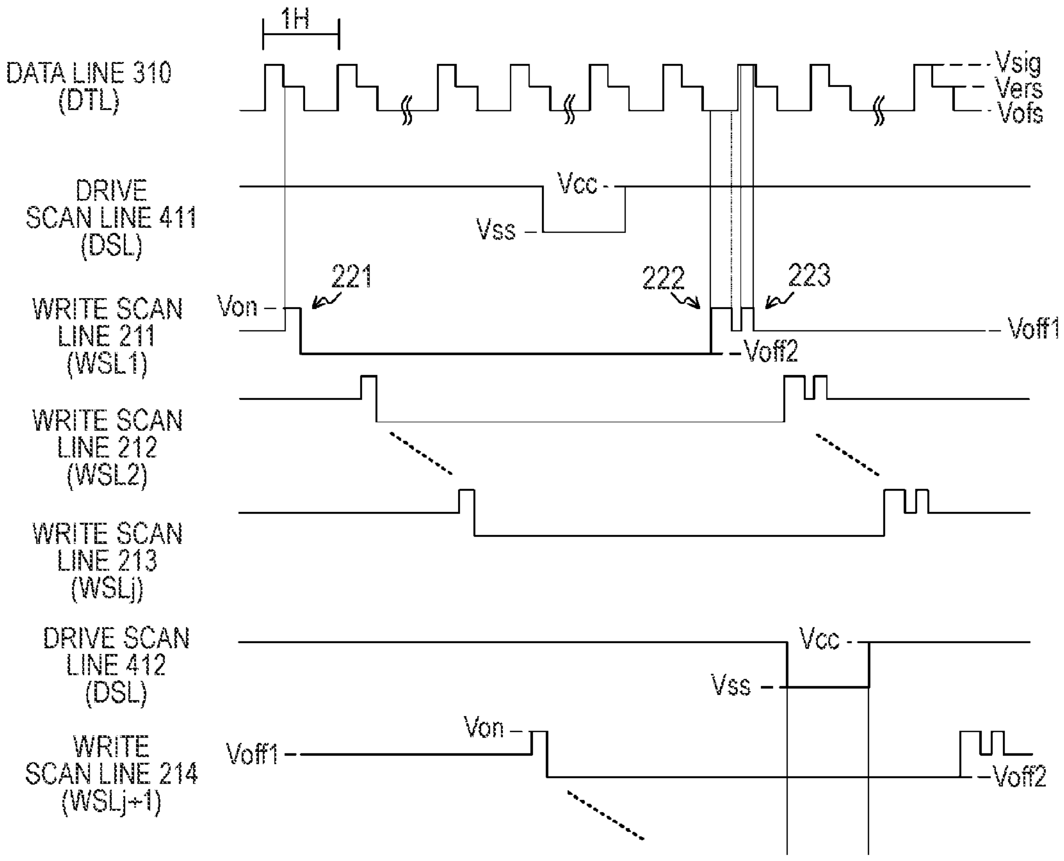
FIG. 3 is a timing chart regarding an example of a basic operation of the display apparatus 100.

FIG. 3 is a timing chart regarding an example of the basis operation of the display apparatus 100. Here, changes in potential of the drive scan lines (DSL) 411 and 412, the data line (DTL) 310, and the write scan lines (WSL) 211 to 214 are shown with the horizontal axis as a common time axis.

As shown in FIG. 2B, changes in potential of the data line (DTL) 310 are changes in potential of a data signal generated by the horizontal selector (HSEL) 300. Changes in potential of the drive scan lines (DSL) 411 and 412 are changes in potential of power supply signals generated by the drivers 401 and 402 in the drive scanner (DSCN) 400. Anyone of a power supply potential (Vcc) for supplying a current to the pixel 600 and an initialization potential (Vss) for initializing the pixel 600 is supplied to the drive scan lines (DSL) 411 and 412.

Changes in potential of the write scan lines (WSL) 211 to 214 are changes in potential of control signals generated by the drivers 201 to 204 in the write scanner (WSCN) 200. As described above, any one of the on potential (Von), the first off potential (Voff1), and the second off potential (Voff2) is supplied to the write scan lines (WSL) 211 to 214 as a control signal. Thus, three pulses 221 to 223 are respectively supplied to the write scan lines (WSL) 211 to 214.

The first pulse 221 is a pulse which gives the potential (Vers) of the extinction signal for extinguishing the light-emission of the pixel 600 to the pixel 600. The second pulse 222 is a pulse which gives the potential (Vofs) of the reference signal for threshold correction to the pixel 600. The third pulse 223 is a pulse for performing mobility correction with respect to a drive transistor constituting the pixel 600 and writing the video signal (Vsig). The respective pulses are supplied to the write scan line (WSL2) 212 after 1H (horizontal scanning period) with respect to the write scan line (WSL1) 211. Though not shown, the respective pulses are supplied to a write scan line next to the write scan line (WSL2) 212 after 1H with respect to the write scan line (WSL2) 212.

In this case, the power supply signal of the drive scan line (DSL) 411 is applied simultaneously to the pixels 600 connected to the write scan lines (WSL) 211 to 213, and the power supply signal of the drive scan line (DSLj+1) 412 is applied to the pixels 600 connected to the write scan line (WSL) 214.

[Example of Configuration of Pixel]

Figure 4:
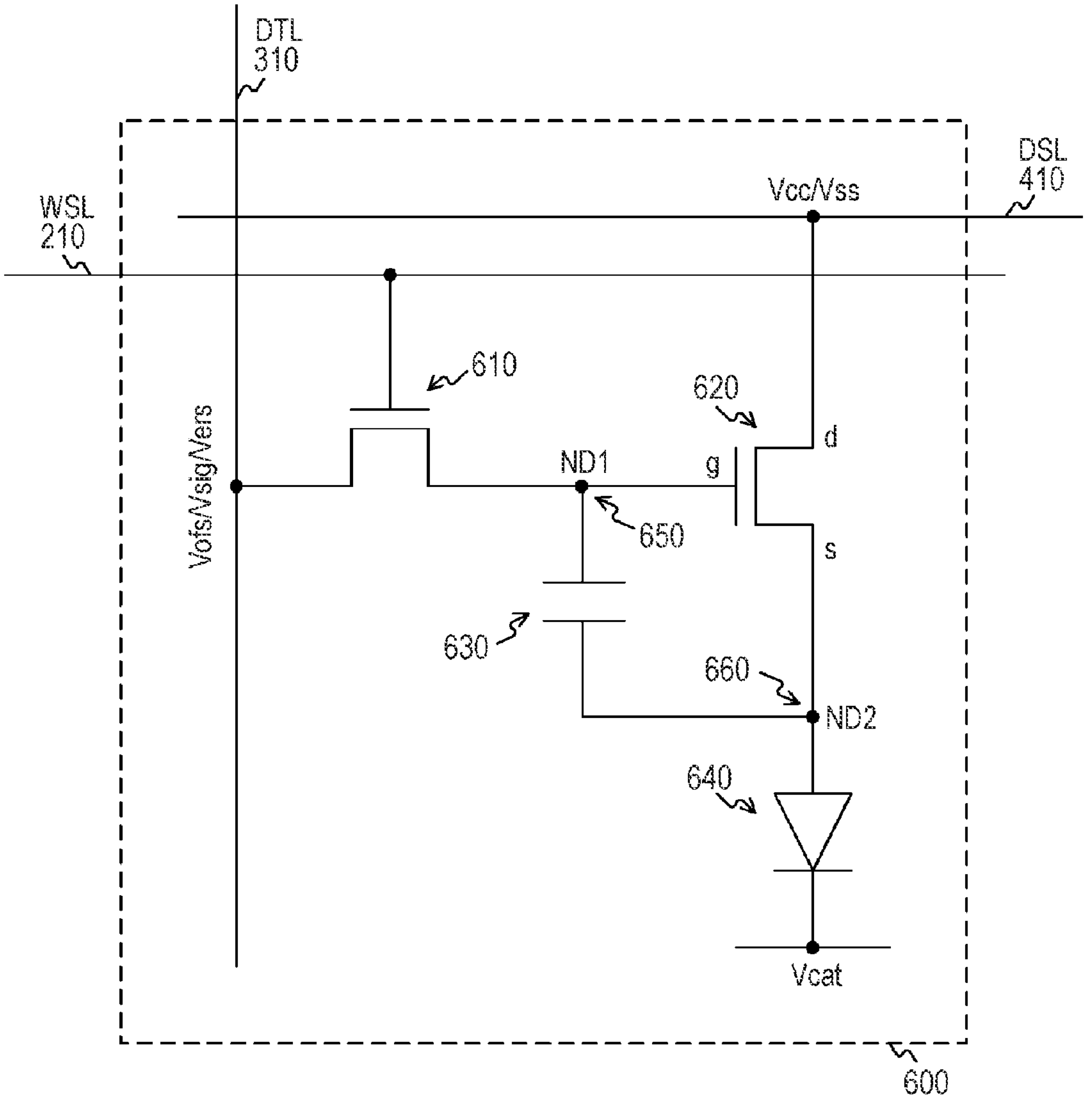
FIG. 4 is a circuit diagram schematically showing an example of the configuration of a pixel 600 in the display apparatus 100.

FIG. 4 is a circuit diagram schematically showing an example of the configuration of the pixel 600 in the display apparatus 100. The pixel 600 includes a write transistor 610, a drive transistor 620, a storage capacitor 630, and a light-emitting device 640. The pixels 600 are an example of a plurality of pixel circuits described in the appended claims. Here, it is assumed that the write transistor 610 and the drive transistor 620 are n-channel transistors.

The gate terminal and the drain terminal of the write transistor 610 are respectively connected to the write scan line (WSL) 210 and the data line (DTL) 310. The source terminal of the write transistor 610 is connected to one electrode of the storage capacitor 630 and the gate terminal (g) of the drive transistor 620. Here, it is assumed that the connection point is a first node (ND1) 650. The drain terminal (d) of the drive transistor 620 is connected to the drive scan line (DSL) 410, and the source terminal (s) of the drive transistor 620 is connected to the other electrode of the storage capacitor 630 and the input terminal of the light-emitting device 640. Here, it is assumed that the connection point is a second node (ND2) 660.

The write transistor 610 writes a data signal from the data line (DTL) 310 to the storage capacitor 630 in accordance with a control signal of the write scan line (WSL) 210. The write transistor 610 gives the potential of the data signal to one electrode of the storage capacitor 630 so as to apply a voltage for causing the light-emitting device 640 to emit light to the storage capacitor 630.

The write transistor 610 writes a voltage corresponding to the video signal to the storage capacitor 630 after causing the storage capacitor 630 to retain a threshold voltage on the basis of the potential (Vofs) of the reference signal by threshold correction. The write transistor 610 also gives the potential (Vers) of the extinction signal to one electrode of the storage capacitor 630. That is, the write transistor 610 gives the potential (Vers) of the extinction signal to the gate terminal of the drive transistor 620 so as to stop the supply of a drive current for causing the light-emitting device 640 to emit light. The write transistor 610 is an example of a write transistor described in the appended claims.

The drive transistor 620 receives the power supply potential (Vcc) from the drive scan line (DSL) 410, and outputs a drive current according to a voltage based on the potential (Vsig) of the video signal written to the storage capacitor 630 to the light-emitting device 640. The drive transistor 620 also stops the supply of the drive current to the light-emitting device 640 by the potential (Vers) of the extinction signal given to the gate terminal thereof by the write transistor 610. The drive transistor 620 is an example of a drive transistor described in the appended claims.

The storage capacitor 630 retains a voltage corresponding to a data signal given by the write transistor 610. The storage capacitor 630 retains, for example, a voltage corresponding to a video signal written by the write transistor 610. The storage capacitor 630 is an example of a storage capacitor described in the appended claims.

The light-emitting device 640 emits light in accordance with the magnitude of a drive current supplied from the drive transistor 620. The light-emitting device 640 may be implemented by, for example, an organic EL device. The light-emitting device 640 is an example of a light-emitting device described in the appended claims.

Although in this embodiment, it is assumed that the write transistor 610 and the drive transistor 620 are n-channel transistors, the invention is not limited to this combination. The transistors may be of an enhancement type, a depletion type, or a dual-gate type.

[Example of Basic Operation of Pixel]

Figure 5:
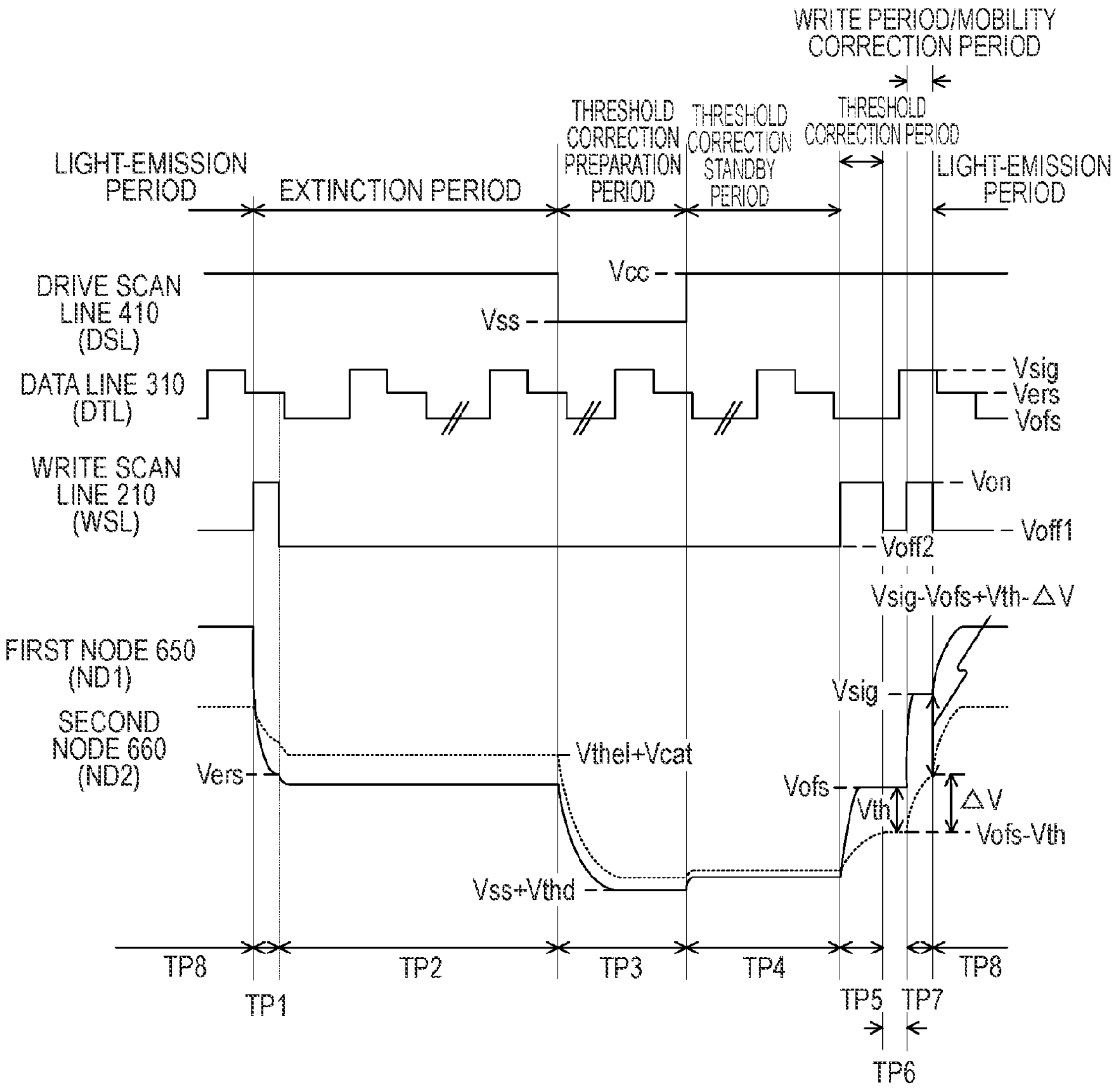
FIG. 5 is a timing chart regarding an example of a basic operation of the pixel 600 in the display apparatus 100.

FIG. 5 is a timing chart regarding an example of the basic operation of the pixel 600 in the display apparatus 100. In this timing chart, changes in potential of the write scan line (WSL) 210, the data line (DTL) 310, the drive scan line (DSL) 410, the first node (ND1) 650, and the second node (ND2) 660 are shown with the horizontal axis as a common time axis. Here, changes in potential of the second node (ND2) 660 are indicated by a dotted line, and other changes in potential are indicated by a solid line. The length of the horizontal axis representing each period is schematic, and thus does not represent a rate of the time length of each period.

In this timing chart, for convenience, the change of the operation of the pixel 600 is divided into periods TP1 to TP8. During a light-emission period TP8, the light-emitting device 640 is in a light-emission state. Immediately before the light-emission period TP8 ends, the control signal of the write scan line (WSL) 210 is set at the first off potential (Voff1), and the data line (DTL) 310 is set at the potential (Vers) of the extinction signal. The power supply signal of the drive scan line (DSL) 410 is set at the power supply potential (Vcc).

Thereafter, a new field of line-sequential scanning is reached, and during an extinction period TP1, the control signal of the write scan line (WSL) 210 is switched from the first off potential (Voff1) to the on potential (Von). Thus, the potential at the first node (ND1) 650 decreases to the potential (Vers) of the extinction signal, and the potential at the second node (ND2) 660 also decreases due to coupling by the storage capacitor 630.

Next, during an extinction period TP2, the control signal of the write scan line (WSL) 210 is switched to the second off potential (Voff2). Thus, the potential at the second node (ND2) 660 decreases to a threshold potential (Vthel+Vcat) of the light-emitting device 640, so the light-emitting device 640 is extinguished. At this time, the potential at the first node (ND1) 650 also decreases due to coupling by the storage capacitor 630. Vthel is the threshold voltage of the light-emitting device 640, and Vcat is a potential which is given to a cathode electrode constituting the light-emitting device 640.

During a threshold correction preparation period TP3, the potential at the first node (ND1) 650 decreases close to the initialization potential (Vss). In this case, if the control signal of the write scan line (WSL) 210 is set at the first off potential (Voff1), a leak current flows from the write transistor 610 toward the first node (ND1) 650. For this reason, the second off potential (Voff2) of the control signal of the write scan line (WSL) 210 is set to be lower than the first off potential (Voff1) taking the potential at the first node (ND1) 650 during the threshold correction preparation period TP3 into consideration.

Next, during the threshold correction preparation period TP3, the power supply signal of the drive scan line (DSL) 410 is switched from the power supply potential (Vcc) to the initialization potential (Vss). Thus, a current flows in the drive transistor 620 toward the drain terminal, such that the potential at the first node (ND1) 650 decreases to "Vss+Vthd". At this time, the potential at the second node (ND2) 660 also decreases. Vthd is a threshold voltage between the drain terminal and the gate terminal of the drive transistor 620. In this embodiment, Vthd refers to a threshold voltage on the drain terminal side.

Next, during a threshold correction standby period TP4, the power supply signal of the drive scan line (DSL) 410 is switched from the initialization potential (Vss) to the power supply potential (Vcc). Thus, a current flows in the drive transistor 620 toward the other electrode of the storage capacitor 630 on the source terminal side, such that the potentials at the first node (ND1) 650 and the second node (ND2) 660 increase.

Next, during a threshold correction period TP5, a threshold correction operation is performed. When the data signal of the data line (DTL) 310 is at the potential (Vofs) of the reference signal, the control signal of the write scan line (WSL) 210 is switched from the second off potential (Voff2) to the on potential (Von). Thus, a voltage corresponding to the threshold voltage (Vth) of the drive transistor 620 is applied between the first node (ND1) 650 and the second node (ND2) 660. Thereafter, during the period TP6, the control signal of the write scan line (WSL) 210 temporarily falls to the first off potential (Voff1), and the data signal of the data line (DTL) 310 is switched from the potential (Vofs) of the reference signal to the potential (Vsig) of the video signal.

Next, during a write period/mobility correction period TP7, the control signal of the write scan line (WSL) 210 rises to the on potential (Von), and the potential at the first node (ND1) 650 increases to the potential (Vsig) of the video signal. Meanwhile, the potential at the second node (ND2) 660 increases by an increased amount (ΔV) due to mobility correction. That is, the control signal of the write scan line (WSL) 210 is at the on potential (Von), such that the potential (Vsig) of the video signal is written to one electrode of the storage capacitor 630. Simultaneously, a potential ((Vofs−Vth)+ΔV) which increases from the potential (Vofs−Vth) applied during the period TP5 by the increased amount (ΔV) due to mobility correction is applied to the other electrode of the storage capacitor 630. Thus, a voltage "Vsig−((Vofs−Vth)+ΔV)" is retained by the storage capacitor 630 as the voltage corresponding to the video signal.

Thereafter, during a light-emission period TP8, the control signal of the write scan line (WSL) 210 is set at the first off potential (Voff1). Thus, the light-emitting device 640 emits light with luminance according to the voltage (Vsig−Vofs+Vth−ΔV) retained by the storage capacitor 630. In this case, the voltage (Vsig−Vofs+Vth−ΔV) retained by the storage capacitor 630 is corrected by the threshold voltage (Vth) and the increased amount (ΔV) due to mobility correction. For this reason, variations in the threshold voltage (Vth) and mobility of the drive transistor 620 do not affect luminance of the light-emitting device 640. During a period halfway to the light-emission period TP8, the potentials at the first node (ND1) 650 and the second node (ND2) 660 increase. At this time, a potential difference (Vsig−Vofs+Vth−ΔV) between the first node (ND1) 650 and the second node (ND2) 660 is maintained.

Although an example where the threshold correction operation is performed once for single light-emission of the light-emitting device 640 has been described, the number of threshold correction operations is not limited thereto. The threshold correction operation may be performed twice or more.

[Details of Operation State of Pixel]

Next, the operation of the pixel 600 will be described in detail with reference to the drawings. The following drawings show the operation states of the pixel 600 corresponding to the periods TP1 to TP8 in the timing chart shown in FIG. 5. For convenience, the parasitic capacitance 641 of the light-emitting device 640 is shown. The write transistor 610 is shown as a switch, and the write scan line (WSL) 210 is omitted.

FIGS. 6A to 6C are circuit diagrams schematically showing the operation states of the pixel 600 corresponding to the periods TP8, TP1, and TP2, respectively. During the light-emission period TP8, as shown in FIG. 6A, the power supply signal of the drive scan line (DSL) 410 is set at the power supply potential (Vcc), and the drive transistor 620 supplies a drive current (Ids) to the light-emitting device 640.

Next, during the extinction period TP1, as shown in FIG. 6B, when the data signal of the data line (DTL) 310 is at the potential (Vers) of the extinction signal, the control signal of the write scan line (WSL) 210 is changed from the first off potential (Voff1) to the on potential (Von). Thus, the write transistor 610 is turned on (conduction state), such that the potential at the first node (ND1) 650 decreases to the potential (Vers) of the extinction signal. At this time, the potential at the second node (ND2) 660 also decreases due to coupling through the storage capacitor 630 caused by the decrease in potential of the first node (ND1) 650. Subsequently, during the extinction period TP2, as shown in FIG. 6C, the control signal of the write scan line (WSL) 210 is changed to the second off potential (Voff2), such that the write transistor 610 is turned off (non-conduction state). In this case, the potential at the second node (ND2) 660 decreases to the threshold potential (Vthel+Vcat) of the light-emitting device 640, such that the light-emitting device 640 is extinguished. The potential at the first node (ND1) also decreases so as to follow the decrease in potential of the second node (ND2) 660.

FIGS. 7A to 7C are circuit diagrams schematically showing the operation states of the pixel 600 corresponding to the periods TP3 to TP5, respectively.

During the threshold correction preparation period TP3 subsequent to the period TP2, as shown in FIG. 7A, the power supply signal of the drive scan line (DSL) 410 is switched from the power supply potential (Vcc) to the initialization potential (Vss). Thus, a current flows in the drive transistor 620 toward the drive scan line (DSL) 410, such that the potential at the second node (ND2) 660 decreases. Simultaneously, the first node (ND1) 650 is in a floating state, so the potential at the first node (ND1) 650 also decreases so as to follow the decrease in potential of the second node (ND2) 660. At this time, the potential at the first node (ND1) 650 decreases until the potential difference between the potential at the first node (ND1) 650 and the initialization potential (Vss) of the drive scan line (DSL) 410 becomes a voltage corresponding to the threshold voltage (Vthd) on the drain terminal side in the drive transistor 620. That is, the potential at the first node (ND1) 650 decreases to "Vss+Vthd".

Next, during the threshold correction standby period TP4, as shown in FIG. 7B, the power supply signal of the drive scan line (DSL) 410 is switched from the initialization potential (Vss) to the power supply potential (Vcc). Thus, a small amount of current flows in the drive transistor 620 toward the other electrode of the storage capacitor 630, such that the potentials at the first node (ND1) 650 and the second node (ND2) 660 increase.

Next, during the threshold correction period TP5, as shown in FIG. 7C, when the data signal of the data line (DTL) 310 is at the potential (Vofs) of the reference signal, the control signal of the write scan line (WSL) 210 is changed from the second off potential (Voff2) to the on potential (Von). Thus, the potential at the first node (ND1) 650 is set at the potential (Vofs) of the reference signal. Therefore, a current flows from the drive transistor 620 to the other electrode of the storage capacitor 630, such that the potential at the second node (ND2) 660 increases.

Next, the potential difference between the first node (ND1) 650 and the second node (ND2) 660 becomes a voltage corresponding to the threshold voltage (Vth) between the source terminal and the gate terminal of the drive transistor 620, and the current stops (cutoff state). Thus, the voltage corresponding to the threshold voltage (Vth) of the drive transistor 620 is retained in the storage capacitor 630 with respect to the potential (Vofs) of the reference signal. In this way, the threshold correction operation is completed. In this case, the potential (Vcat) at the cathode electrode is set such that no current from the drive transistor 620 flows in the light-emitting device 640.

FIGS. 8A to 8C are circuit diagrams schematically showing the operation states of the pixel 600 corresponding to the periods TP6 to TP8, respectively.

During the period TP6 subsequent to the period TP5, as shown in FIG. 8A, the control signal in the write scan line (WSL) 210 is changed from the on potential (Von) to the second off potential (Voff2), such that the write transistor 610 is turned off (non-conduction state). Thereafter, the data signal of the data line (DTL) 310 is switched from the potential (Vofs) of the reference signal to the potential (Vsig) of the video signal. In this case, in the data line (DTL) 310, the rising edge of the potential (Vsig) of the video signal becomes moderate by the write transistor 610 in each of a plurality of pixels 600 connected to the data line (DTL) 310. For this reason, the write transistor 610 is turned off until the data signal reaches the potential (Vsig) of the video signal taking the transient characteristics of the data line (DTL) 310.

During the write period/mobility correction period TP7 subsequent to the period TP6, as shown in FIG. 8B, the control signal of the write scan line (WSL) 210 is changed to the on potential (Von), such that the write transistor 610 is turned on. Thus, the potential at the first node (ND1) 650 is set at the potential (Vsig) of the video signal. Simultaneously, a current flows from the drive transistor 620 to the other electrode of the storage capacitor 630, such that the potential at the second node (ND2) 660 increases by "ΔV". Then, the potential difference between the first node (ND1) 650 and the second node (ND2) 660 becomes "Vsig−Vofs+Vth−ΔV". In this way, writing of the potential (Vsig) of the video signal and adjustment of the increased amount (ΔV) due to mobility correction are performed.

During this operation, the larger the potential (Vsig) of the video signal is, the larger the current output from the drive transistor is, so the increased amount (ΔV) due to mobility correction increases. Therefore, mobility correction based on a luminance level (the potential of the video signal) can be performed. When the potential (Vsig) of the video signal for each pixel is fixed, as a drive transistor of a pixel has large mobility, the increased amount (ΔV) due to mobility correction increases. For example, in the case of a pixel where a drive transistor has large mobility, the amount of a current flowing toward the other electrode of the storage capacitor increases, as compared with a pixel having small mobility, so the gate-source voltage of the drive transistor decreases as much. Therefore, in the case of a pixel where a drive transistor has large mobility, the drive current which is supplied to the light-emitting device during the light-emission period is adjusted so as to have the same magnitude as a pixel having small mobility. In this way, variation in mobility of the drive transistor for each pixel is eliminated.

Next, during the light-emission period TP8, as shown in FIG. 8C, the control signal of the write scan line (WSL) 210 is changed to the first off potential (Voff1), such that the write transistor 610 is turned off. When this happens, the potential at the second node (ND2) 660 increases due to the drive current (Ids) from the drive transistor 620, and the potential at the first node (ND1) 650 also increases. At this time, the potential difference (Vsig−Vofs+Vth−ΔV) between the first node (ND1) 650 and the second node (ND2) 660 is maintained by a bootstrap operation.

As described above, after a voltage corresponding to the threshold voltage (Vth) is retained by the storage capacitor 630 through the threshold correction operation, the increased amount (ΔV) due to the mobility correction operation is applied to the other electrode of the storage capacitor 630. Therefore, variations in the threshold voltage and mobility of the drive transistor 620 for each pixel 600 are cancelled, and as a result, irregularity or the like in the display image can be suppressed.

In such a display apparatus 100, it is assumed that the potential at the second node (ND2) 660 does not sufficiently decrease during the extinction period TP1 due to the parasitic capacitance 641 of the light-emitting device 640 and parasitic capacitance of the drive transistor 620. The operation of the pixel 600 when the potential at the second node (ND2) 660 does not sufficiently decrease during the extinction period TP1 will now be described with reference to the drawings.

[Example where Decrease in Potential of Second Node During Extinction Period is Moderate]

Figure 9:
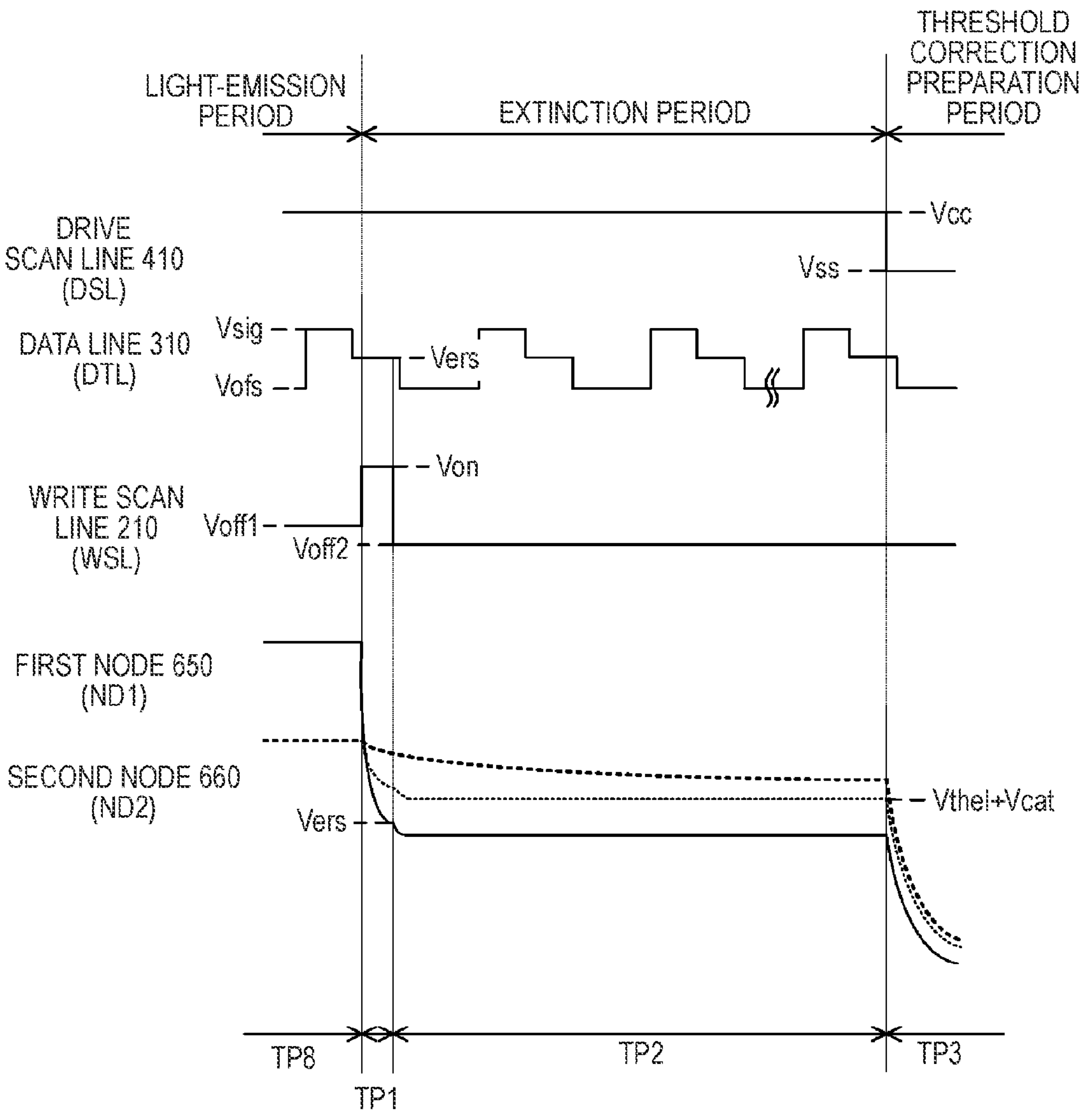
FIG. 9 is a timing chart illustrating an operation of the pixel 600 when the potential at a second node (ND2) 660 moderately decreases during an extinction period TP1 in the display apparatus 100.

FIG. 9 is a timing chart showing the operation of the pixel 600 when the potential at the second node (ND2) 660 moderately decreases during the extinction period TP1 in the display apparatus 100. Changes in potential other than changes in potential of the second node (ND2) 660 represented by a bold dotted line are the same as shown in FIG. 5. Changes in potential of the second node (ND2) 660 represented by a fine dotted line are changes in potential of the second node (ND2) 660 shown in FIG. 5.

In this embodiment, description will be provided focusing on changes in potential of the second node (ND2) 660 represented by the bold dotted line. During the extinction period TP1, the potential at the second node (ND2) 660 decreases due to coupling from the storage capacitor 630 so as to follow the decrease in potential of the first node (ND1) 650. In this case, the potential at the second node (ND2) 660 does not decrease rapidly by the effect of the parasitic capacitance 641 of the light-emitting device 640 or the like. During the extinction period TP2, the potential at the second node (ND2) 660 decreases gradually, and the extinction period TP2 is changed to the threshold correction preparation period TP3 before the threshold voltage (Vthel+Vcat) of the light-emitting device 640 is reached.

At this time, the potential at the second node (ND2) 660 is higher than the threshold potential (Vthel+Vcat) of the light-emitting device 640, so a current continues to flow in the light-emitting device 640. For this reason, during the extinction period TP2, the luminance gradually decreases, but the light-emitting device 640 continues to emit light.

Thereafter, during the threshold correction preparation period TP3, the power supply signal of the drive scan line (DSL) 410 is switched from the power supply potential (Vcc) to the initialization potential (Vss), such that the potential at the second node (ND2) 660 is lower than the threshold potential (Vthel+Vcat) of the light-emitting device 640. Thus, the light-emitting device 640 is completely extinguished.

As described above, the light-emitting device 640 continues to emit light immediately before the threshold correction preparation period TP3. In the display apparatus 100, the power supply signals are switched simultaneously in terms of plural number of rows (groups). Accordingly, as shown in FIG. 3, the extinction period TP2 differs for every row of pixels 600. For this reason, the period in which the light-emitting device 640 emits light differs for every row of pixels 600.

Figures 10A, 10B:
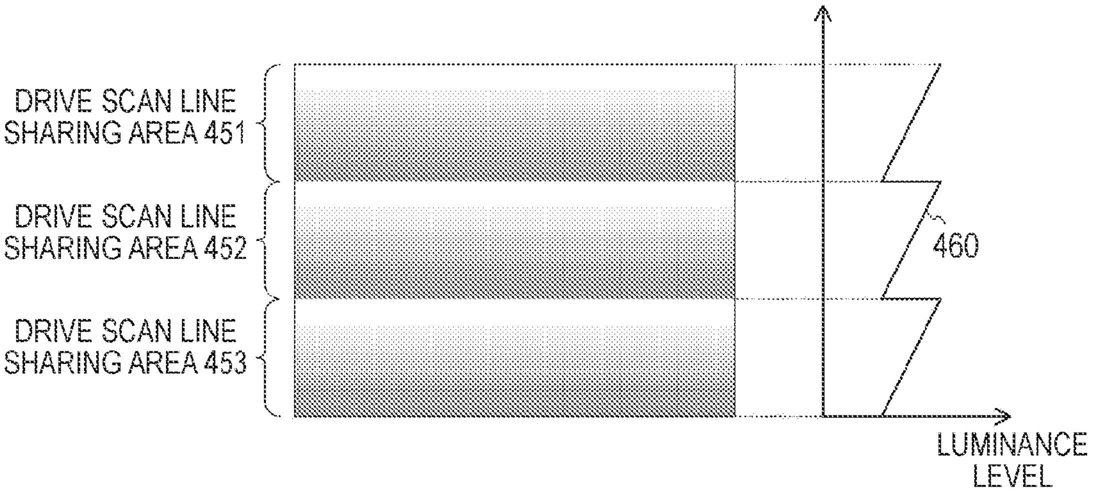
FIGS. 10A and 10B are diagrams regarding a display image which is displayed on the display apparatus 100 when the potential at the second node (ND2) 660 moderately decreases during the extinction period TP1 in the display apparatus 100.

FIGS. 10A and 10B are diagrams regarding a display image which is displayed on the display apparatus 100 when the potential at the second node (ND2) 660 moderately decreases during the extinction period TP1 in the display apparatus 100. FIG. 10A is a diagram showing an example of a display image which is displayed on the display apparatus 100. FIG. 10B is a diagram showing luminance characteristics in a column direction with respect to a display image.

Here, it is assumed that an input image input to the display apparatus 100 is entirely a gray color image.

FIG. 10A shows drive scan line sharing areas 451 to 453. The drive scan line sharing areas 451 to 453 represent areas displayed by the pixels 600 to which the same power supply signal is supplied. The drive scan line sharing areas 451 to 453 are gradually darkened sequentially from the upper row. The darkest color in the drive scan line sharing areas 451 to 453 becomes the color of the input image.

FIG. 10B shows a luminance characteristic 460. Here, the vertical axis represents a horizontal line of a display image, and the horizontal axis represents a luminance level. The luminance characteristic 460 is a luminance characteristic showing a luminance level corresponding to the horizontal line of the display image shown in FIG. 10A.

As described above, when the potential at the second node (ND2) 660 does not sufficiently decrease during the extinction period TP1, gradation occurs in the display image due to light-emission of the pixels 600 during the extinction period TP2 which differs for every row. A first embodiment of the invention described below relates to an improvement for reducing gradation in the display image.

[Example of Configuration of Horizontal Selector]

Figure 11A:
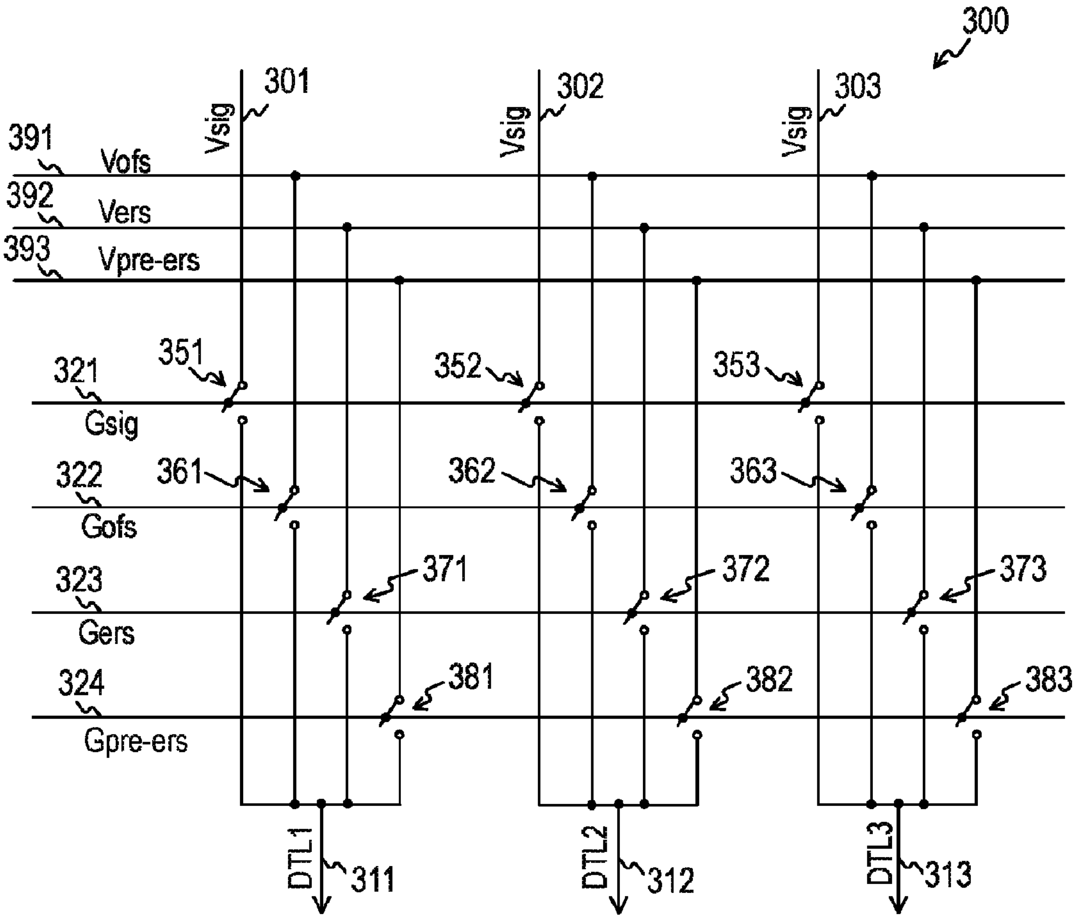
FIGS. 11A and 11B are diagrams showing an example of a method of generating data signals, which are supplied to data lines (DTL) 311 to 313, by a horizontal selector (HSEL) 300 according to a first embodiment of the invention.
Figure 11B:
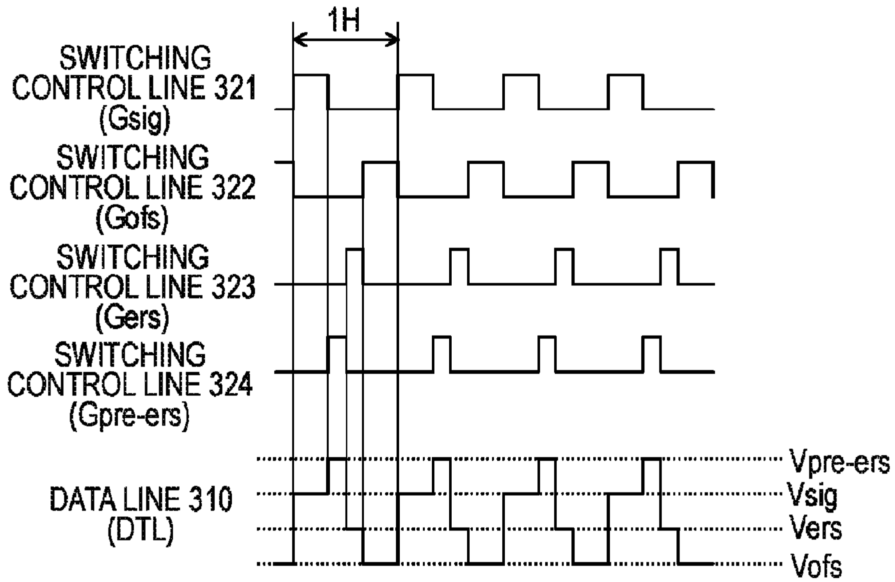

FIGS. 11A and 11B are diagrams showing an example of a method of generating data signals, which are supplied to data lines (DTL) 311 to 313, by a horizontal selector (HSEL) 300 according to a first embodiment of the invention.

FIG. 11A is a block diagram showing an example of the configuration of the horizontal selector (HSEL) 300 according to the first embodiment of the invention. Parts other than a switching control line 324, switching circuits 381 to 383, and an extinction preparation signal line 393 are the same as those shown in FIG. 2A. Therefore, the same parts are represented by the same reference numerals, and description thereof will not be repeated. The horizontal selector (HSEL) 300 is an example of a signal supply circuit described in the appended claims.

A predetermined extinction preparation signal (Vpre-ers) higher than the potential (Vers) of the extinction signal is supplied to the extinction preparation signal line 393. The potential (Vpre-ers) of the extinction preparation signal is an example of a high-level potential described in the appended claims.

A switching control signal (Gpre-ers) for controlling switching of the switching circuits 381 to 383 is supplied to the switching control line 324. The switching circuits 381 to 383 switch connection and disconnection between the extinction preparation signal line 393 and the data lines (DTL) 311 to 313 on the basis of the switching control signal (Gpre-ers) from the switching control line 324.

FIG. 11B is a timing chart showing changes in potential of the switching control lines 321 to 324 and the data line (DTL) 310 in the configuration shown in FIG. 11A. Here, changes in potential of the switching control lines 321 to 324 and the data line (DTL) 310 are shown with the horizontal axis as a common time axis. Although the potential (Vsig) of the video signal changes depending on a video signal input to the display apparatus 100, in this embodiment, it is assumed that the video signal is at fixed potential.

Here, the operation of the horizontal selector (HSEL) 300 during one horizontal scanning period will be described. First, immediately before a previous horizontal scanning period ends, the potential of the switching control signal (Gsig) in the switching control line 321 is set at L level, and the potential of the switching control signal (Gofs) in the switching control line 322 is set at H level. The potential of the switching control signal (Gers) in the switching control line 323 is set at L level, and the switching control signal (Gpre-prs) in the switching control line 324 is set at L level.

Then, during one horizontal scanning period (1H), the potential of the switching control signal (Gsig) in the switching control line 321 is changed from L level to H level. Simultaneously, the potential of the switching control signal (Gofs) in the switching control line 322 is switched from H level to L level. When this happens, the video signal lines 301 to 303 and the data lines (DTL) 311 to 313 are respectively connected to each other by the switching circuits 351 to 353, so the video signal (Vsig) is supplied to the data line (DTL) 310 as the data signal.

Next, the potential of the switching control signal (Gsig) in the switching control line 321 is switched from H level to L level, and the potential of the switching control signal (Gpre-ers) in the switching control line 324 is switched from L level to H level. When this happens, the extinction preparation signal line 393 and the data lines (DTL) 311 to 313 are connected to each other by the switching circuits 381 to 383, so the extinction preparation signal (Vpre-ers) is supplied to the data line (DTL) 310 as the data signal.

Next, the potential of the switching control signal (Gpre-ers) in the switching control line 324 is switched from H level to L level, and the potential of the switching control signal (Gers) in the switching control line 323 is switched from L level to H level. When this happens, the extinction signal line 392 and the data lines (DTL) 311 to 313 are connected to each other by the switching circuits 371 to 373, so the extinction signal (Vers) is supplied to the data line (DTL) 310 as the data signal.

Then, the potential of the switching control signal (Gers) in the switching control line 323 is changed from H level to L level, and the potential of the switching control signal (Gofs) in the switching control line 322 is switched from L level to H level. When this happens, the reference signal line 391 and the data lines (DTL) 311 to 313 are connected to each other by the switching circuits 361 to 363, so the reference signal (Vofs) is supplied to the data line (DTL) 310 as the data signal.

As described above, the horizontal selector (HSEL) 300 is provided with the switching control line 324, the switching circuits 381 to 383, and the extinction preparation signal line 393, such that during one horizontal scanning period, the potential (Vpre-ers) of the extinction preparation signal can be newly provided in the data signal. That is, the horizontal selector (HSEL) 300 can supply any one of the potential (Vofs) of the reference signal, the potential (Vsig) of the video signal, the potential (Vers) of the extinction signal, and the potential (Vpre-ers) of the extinction preparation signal to the pixel 600. The horizontal selector (HSEL) 300 can also generate the data signal of the data line (DTL) 310 in order of the potential (Vpre-ers) of the extinction preparation signal and the potential (Vers) of the extinction signal. Next, the operation of the pixel 600 in the display apparatus 100 including the horizontal selector (HSEL) 300 according to the first embodiment of the invention will be described.

[Example of Operation of Pixel]

Figure 12:
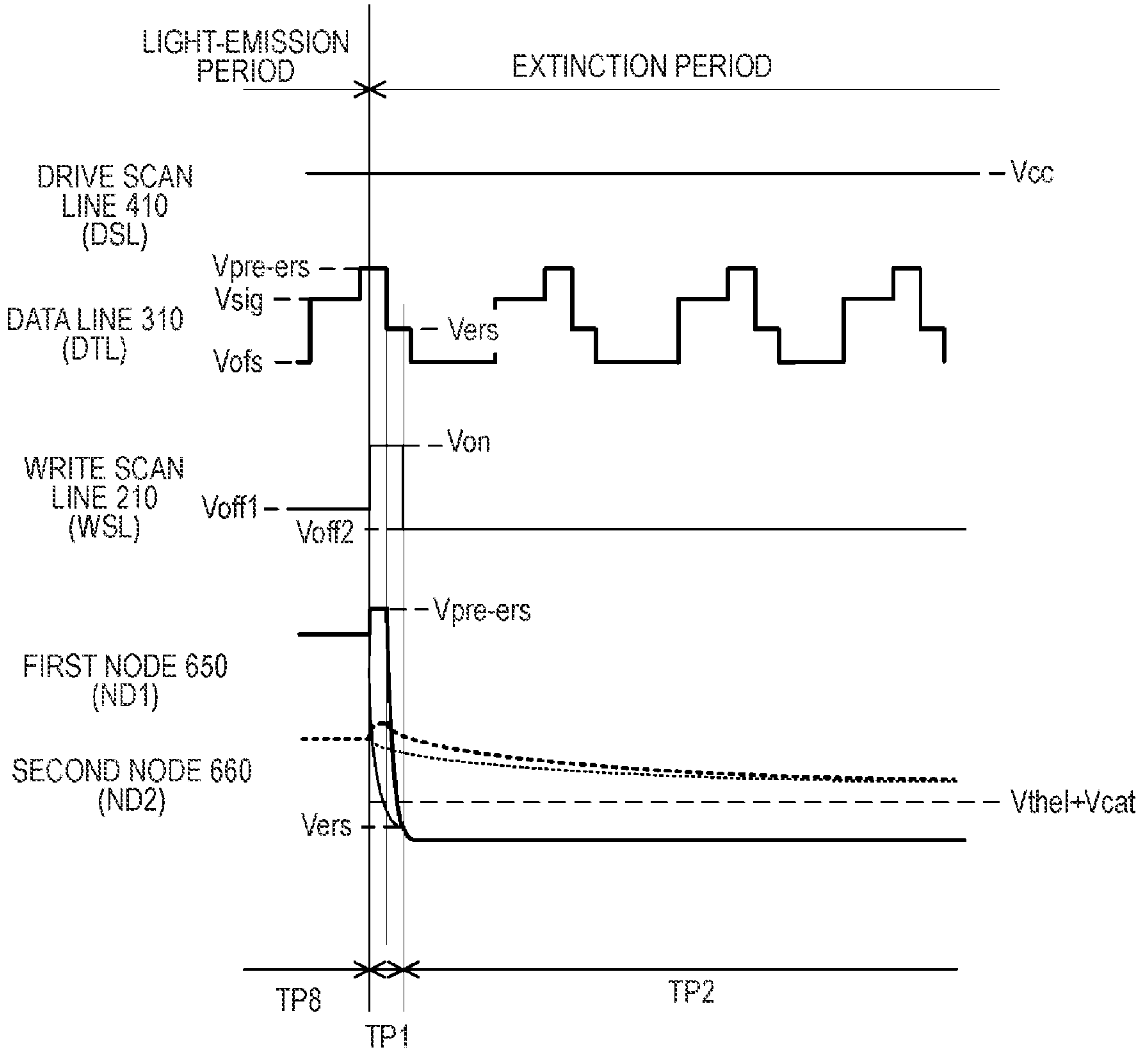
FIG. 12 is a timing chart regarding an example of an operation of the pixel 600 according to the first embodiment of the invention.

FIG. 12 is a timing chart regarding an example of the operation of the pixel 600 according to the first embodiment of the invention. Changes in potential other than changes in potential of the data line (DTL) 310 and the second node (ND2) 660 are the same as those shown in FIG. 9. Changes in potential of the second node (ND2) 660 represented by a fine dotted line are changes in potential of the second node (ND2) 660 represented by the bold dotted line of FIG. 9. In this embodiment, it is assumed that the potential at the first node 650 is lower than the potential (Vpre-ers) of the extinction preparation signal during the light-emission period TP8.

Here, description will be provided focusing on changes in potential of the second node (ND2) 660 represented by the bold dotted line. During the extinction period TP1, the control signal of the write scan line (WSL) 210 is at the on potential (Von), so the potential at the first node (ND1) 650 is set at the potential of the extinction preparation signal (Vpre-ers). Thus, the potential at the first node (ND1) 650 rapidly rises, such that the potential at the second node (ND2) 660 increases due to coupling from the storage capacitor 630. For this reason, the potential becomes higher than the second node (ND2) 660 represented by the fine dotted line.

When the control signal of the write scan line (WSL) 210 is at the on potential (Von), the data signal of the data line (DTL) 310 is switched to the potential (Vers) of the extinction signal. When this happens, the potential at the first node (ND1) 650 decreases to the potential (Vers) of the extinction signal, so the potential at the second node (ND2) 660 also slightly decreases.

Thereafter, during the extinction period TP2, the control signal of the write scan line (WSL) 210 is switched to the second off potential (Vff2), and the potential at the second node (ND2) 660 is gradually decreasing.

As described above, during the extinction period TP1, the data signal of the data line (DTL) 310 is generated in order of the potential (Vpre-ers) of the extinction preparation signal and the potential (Vers) of the extinction signal, so the potential at the second node (ND2) 660 can be increased. That is, during the extinction period TP1, the potential is given to the gate terminal of the drive transistor 620 by the write transistor 610 in order of the potential (Vpre-ers) of the extinction preparation signal and the potential (Vers) of the extinction signal. Thus, the potential at the second node (ND2) 660 increases due to coupling through the storage capacitor 630 with a rapid increase in potential of the first node (ND1) 650 at the time of the start of the extinction period. For this reason, a current which is supplied to the light-emitting device 640 during the extinction period increases due to the increase in potential of the second node (ND2) 660. Next, gradation in the display image due to the increase in potential of the second node (ND2) 660 during the extinction period TP1 will be described below with reference to the drawings.

[Example of Modeling Regarding Increase in Potential of Second Node During TP1]

Figure 13A:
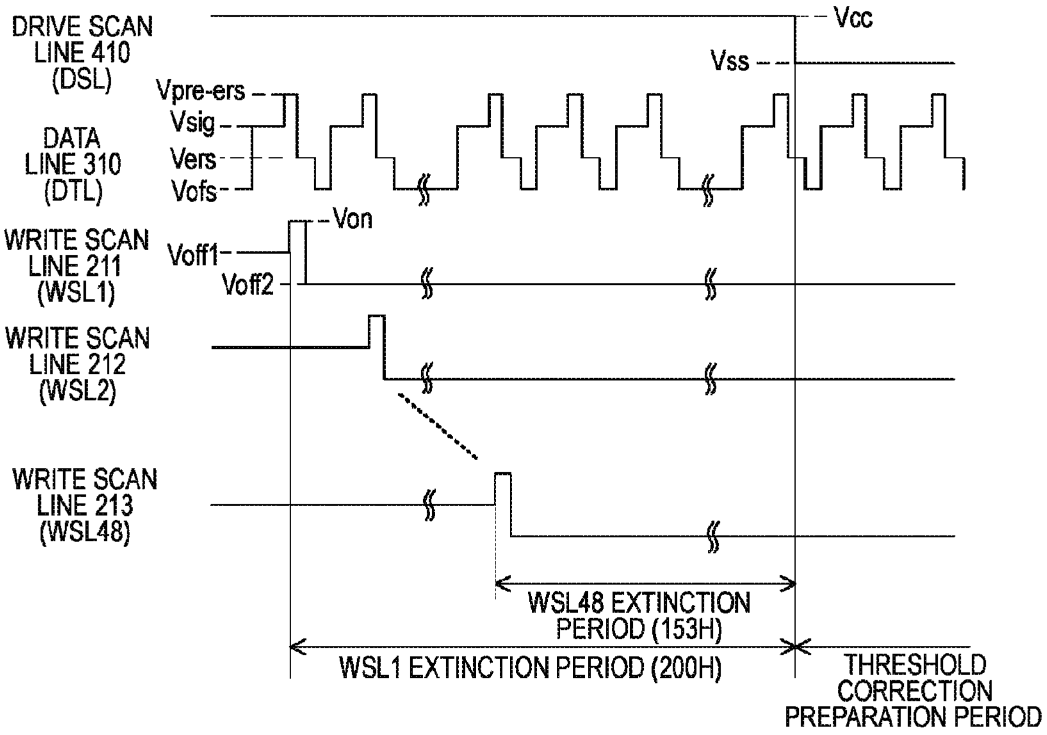
FIGS. 13A and 13B are diagrams regarding gradation in a display image due to an increase in potential of the second node (ND2) 660 during the extinction period TP1 according to the first embodiment of the invention.
Figure 13B:
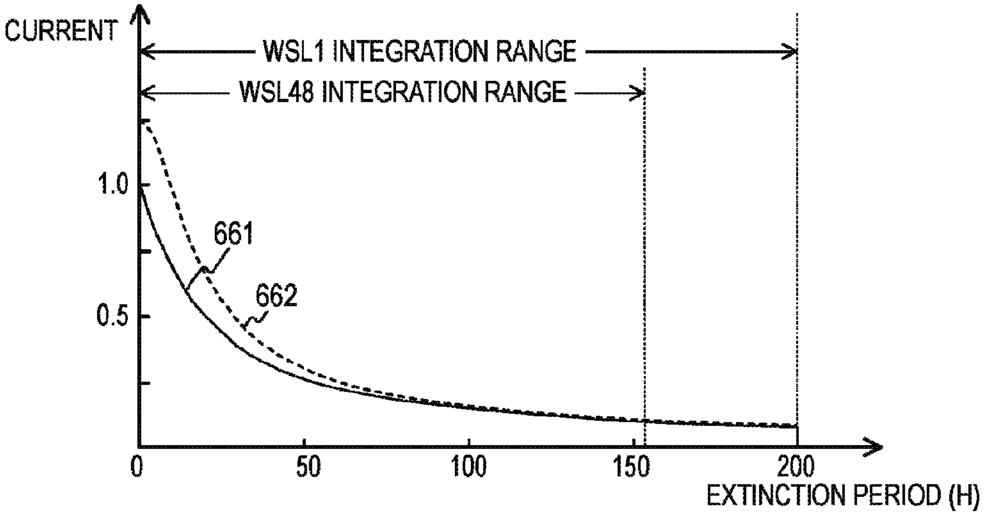

FIGS. 13A and 13B are diagrams regarding gradation of the display image due to the increase in potential of the second node (ND2) 660 during the extinction period TP1 according to the first embodiment of the invention.

FIG. 13A is a timing chart showing an example of the operation of the display apparatus 100 which supplies the same power supply signal to the pixels 600 in terms of 48 rows. Here, changes in potential of the drive scan line (DSL) 411, the data line (DTL) 310, and the write scan lines (WSL) 211 to 213 are shown with the horizontal axis as a common time axis. In this embodiment, the extinction period of the write scan line (WSL1) 211 is 200H (horizontal scanning period). The extinction period of the write scan line (WSL48) 213 is 153H. As described above, it can be seen that the extinction period differs for every row of pixels 600, and a lower row of pixels 600 has a shorter extinction period.

FIG. 13B is a diagram showing an example of a calculation result of characteristics of the current supplied to the light-emitting device 640 during the extinction periods TP1 and TP2 in FIG. 13A on the basis of an RC model. Here, a current characteristic 661 is represented by a solid line and a current characteristic 662 is represented by a broken line. The horizontal axis represents an extinction period, and the vertical axis represents a current value supplied to the light-emitting device 640. The current value is normalized with respect to a current value immediately before the extinction period when there is no extinction preparation signal (Vpre-ers) in the data signal.

The current characteristic 661 is a current characteristic when there is no increase in potential of the second node (ND2) 660 due to the extinction preparation signal (Vpre-ers). The current characteristic 662 is a current characteristic when there is an increase in potential of the second node (ND2) 660 due to the extinction preparation signal (Vpre-ers). The current characteristic 662 is a current characteristic when the magnitude of a current at the time of the start of the extinction period is "1.25".

This means that, as a difference between the integration values of the current values in the pixels 600 connected to the write scan line (WSL1) 211 and the write scan line (WSL48) 213 increases, gradation in the display image increases. Here, a comparison result of the integration value in the current characteristic 661 and the integration value in the current characteristic 662 is shown in a subsequent drawing.

FIG. 14 is a diagram showing a comparison result of the integration values in the current characteristics 661 and 662 shown in FIG. 13B.

The first row of integration value 711 represents the integration value in the WSL1 integration range shown in FIG. 13B. The 48-th row of integration value 712 represents the integration value of the WSL48 integration range shown in FIG. 13B. A difference ratio 713 represents a value which is calculated by dividing a value, which is obtained by subtracting the 48-th row of integration value 712 from the first row of integration value 711, by the first row of integration value 711.

In the current characteristic 720, "current small" represents the integration value of the current characteristic 661 shown in FIG. 13B. In the current characteristic 720, "current large" represents the integration value of the current characteristic 662 shown in FIG. 13B.

As described above, the current supplied to the light-emitting device 640 during the extinction period TP1 increases, such that the difference ratio 713 decreases. Therefore, gradation in the display image can be reduced. That is, the potential at the second node (ND2) 660 is increased by using the potential (Vpre-ers) of the extinction preparation signal during the extinction period TP1, so gradation in the display image can be reduced. To make gradation in the display image difficult to be viewed, the difference ratio 713 is preferably suppressed to "5%".

Here, a method of setting the potential (Vpre-ers) of the extinction preparation signal will be described in brief. The difference ratio 713 decreases as the potential (Vpre-ers) of the extinction preparation signal is set higher, but if the potential (Vpre-ers) of the extinction preparation signal is excessively high, the amount of light emission of the light-emitting device 640 during the extinction periods TP1 and TP2 increases. For example, when an input image is black, a display image is brighter than black. That is, an isolated block display image is obtained. For this reason, the potential (Vpre-ers) of the extinction preparation signal is preferably set within the potential (Vsig) of the video signal. Further, since gradation in the display image is viewed with respect to the input image near black, the potential (Vpre-ers) of the extinction preparation signal is preferably set within the range lower than half of the range of the potential (Vsig) of the video signal. Therefore, gradation in the display image can be reduced, and reproducibility of the input image near black can be maintained.

As described above, the extinction preparation signal (Vpre-ers) and the extinction signal (Vers) are given to the first node (ND1) 650 in that order during the extinction period TP1, such that gradation in a display image displayed on the display apparatus 100 can be moderated. Although in the first embodiment of the invention, an example where the extinction preparation signal (Vpre-ers) in the data signal is generated after the video signal (Vsig) has been described, the extinction preparation signal (Vpre-ers) may be generated after the reference signal (Vofs).

[Modification of Generated Waveform of Data Signal]

Figure 15A:
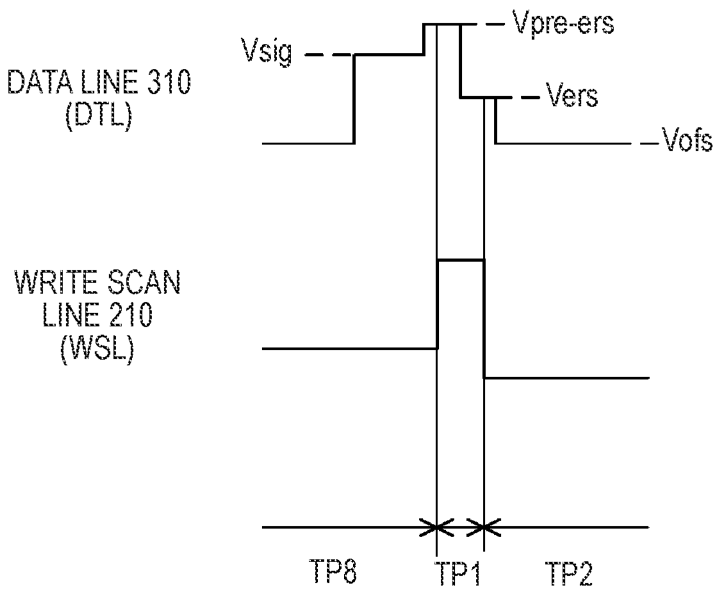
FIGS. 15A and 15B are diagrams showing a modification of the generated waveform of a data signal according to the first embodiment of the invention.
Figure 15B:
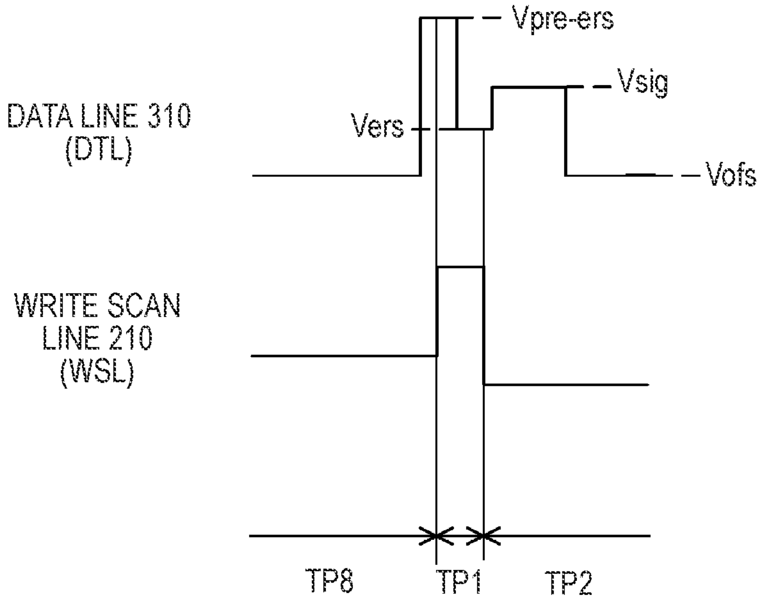

FIGS. 15A and 15B are diagrams showing a modification of the generated waveform of a data signal according to the first embodiment of the invention. Here, changes in potential of the data line (DTL) 310 and the write scan line (WSL) 210 are shown with the horizontal axis as a common time axis. FIG. 15A is a diagram showing the waveform of the data signal according to the first embodiment of the invention. In this case, the data signal in the data line (DTL) 310 is generated in order of the reference signal (Vofs), the video signal (Vsig), the extinction preparation signal (Vpre-ers), and the reference signal (Vofs).

FIG. 15B is a diagram showing an example where the potential (Vpre-ers) of the extinction preparation signal in the data signal is generated after the potential (Vofs) of the reference signal. In this case, the data signal in the data line (DTL) 310 is generated in order of the reference signal (Vofs), the extinction preparation signal (Vpre-ers), the video signal (Vsig), and the reference signal (Vofs).

As described above, the extinction preparation signal (Vpre-ers) may be generated after the reference signal (Vsig) without changing the order of the extinction preparation signal (Vpre-ers) and the extinction signal (Vers).

As described above, according to the first embodiment of the invention, even when the same power supply signal is supplied for every plural number of rows of pixels 600, with the potential (Vpre-ers) of the extinction preparation signal in the data signal, gradation in the display image can be reduced. Therefore, reproducibility of the input image can be maintained, and the number of drivers of the drive scanner (DSCN) 400 can be reduced. As a result, reduction in costs can be achieved.

The display apparatus according to the first embodiment of the invention has a flat panel shape, and may be used as the display of various electronic instruments, for example, as a digital camera, a notebook type personal computer, a mobile phone, a video camera, and the like. The display apparatus may also be used as the display of electronic instruments in all fields which displays a video signal input to an electronic instrument or a video signal generated in an electronic instrument as an image or video. Examples of the electronic instrument in which such a display apparatus is used will be described below.

<2. Second Embodiment>

[Applications to Electronic Instrument]

Figure 16:
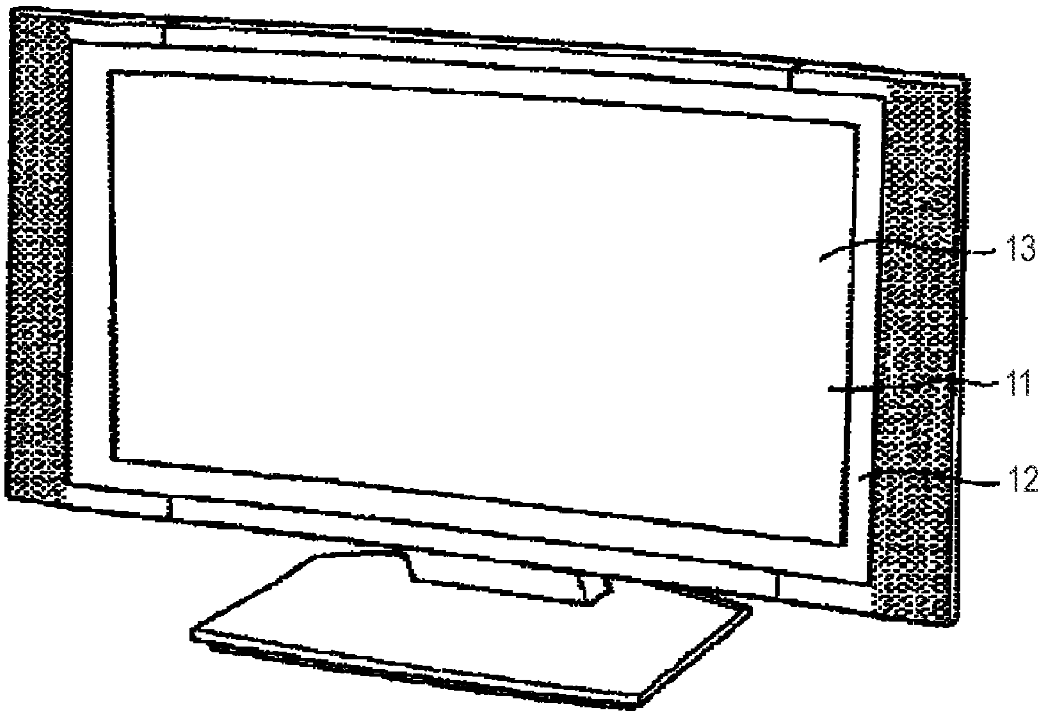
FIG. 16 is a perspective view showing a television set according to a second embodiment of the invention.

FIG. 16 is an example of a television set according to a second embodiment of the invention. This television set is a television set to which the first embodiment of the invention are applied. The television set includes a front panel 12, and a video display screen 11 formed by a filter glass 13 or the like, and is manufactured by using the display apparatus according to the first embodiment of the invention for the video display screen 11.

Figure 17:
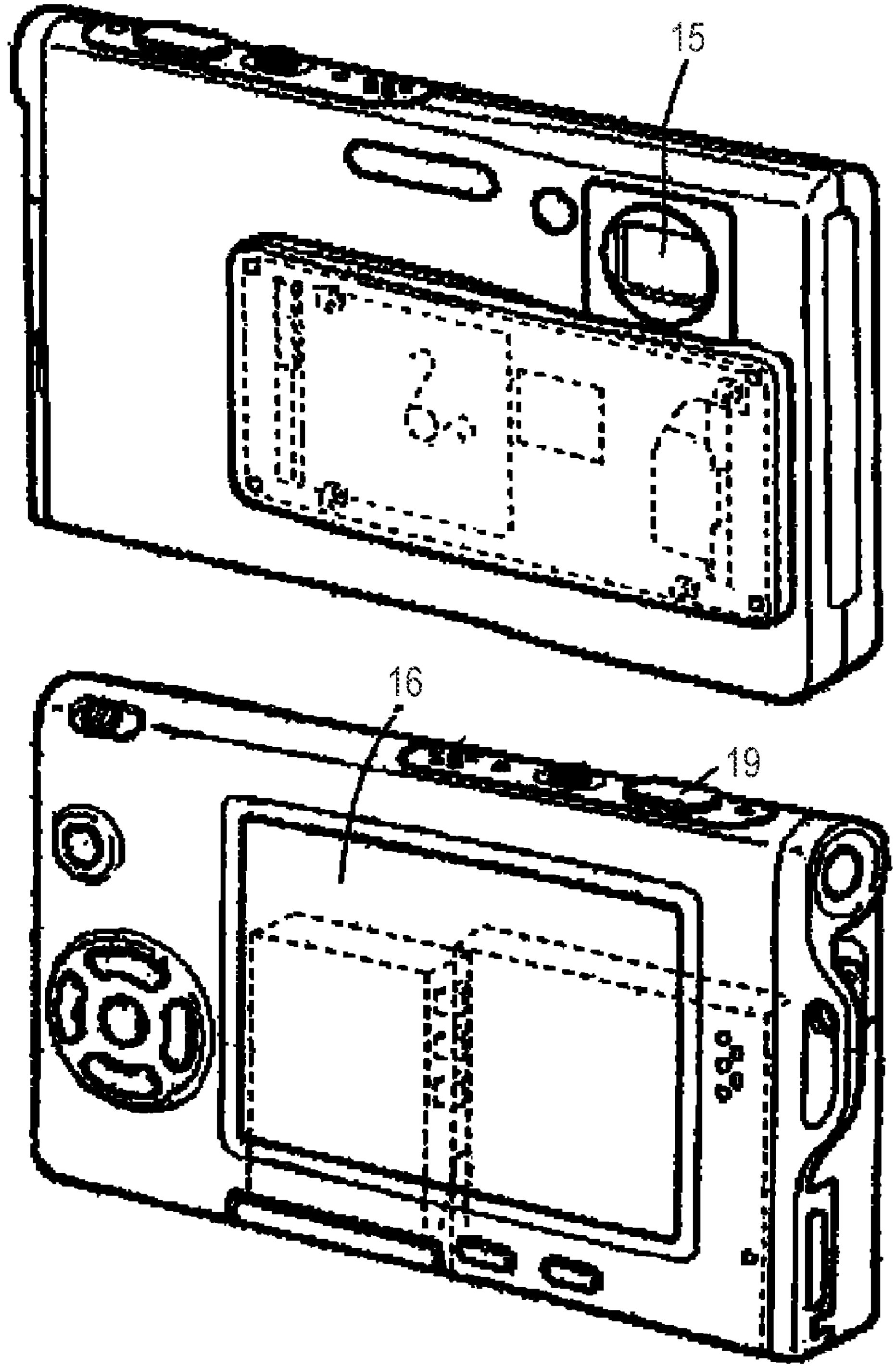
FIG. 17 is a perspective view showing a digital still camera according to the second embodiment of the invention.

FIG. 17 is a digital still camera according to the second embodiment of the invention. This digital still camera is a digital still camera to which the first embodiment of the invention is applied. Here, the upper portion shows a front view of the digital still camera, and the lower portion shows a rear view of the digital still camera. The digital still camera includes an imaging lens 15, a display unit 16, a control switch, a menu switch, a shutter 19, and the like, and is manufactured by using the display apparatus according to the first embodiment of the invention for the display unit 16.

Figure 18:
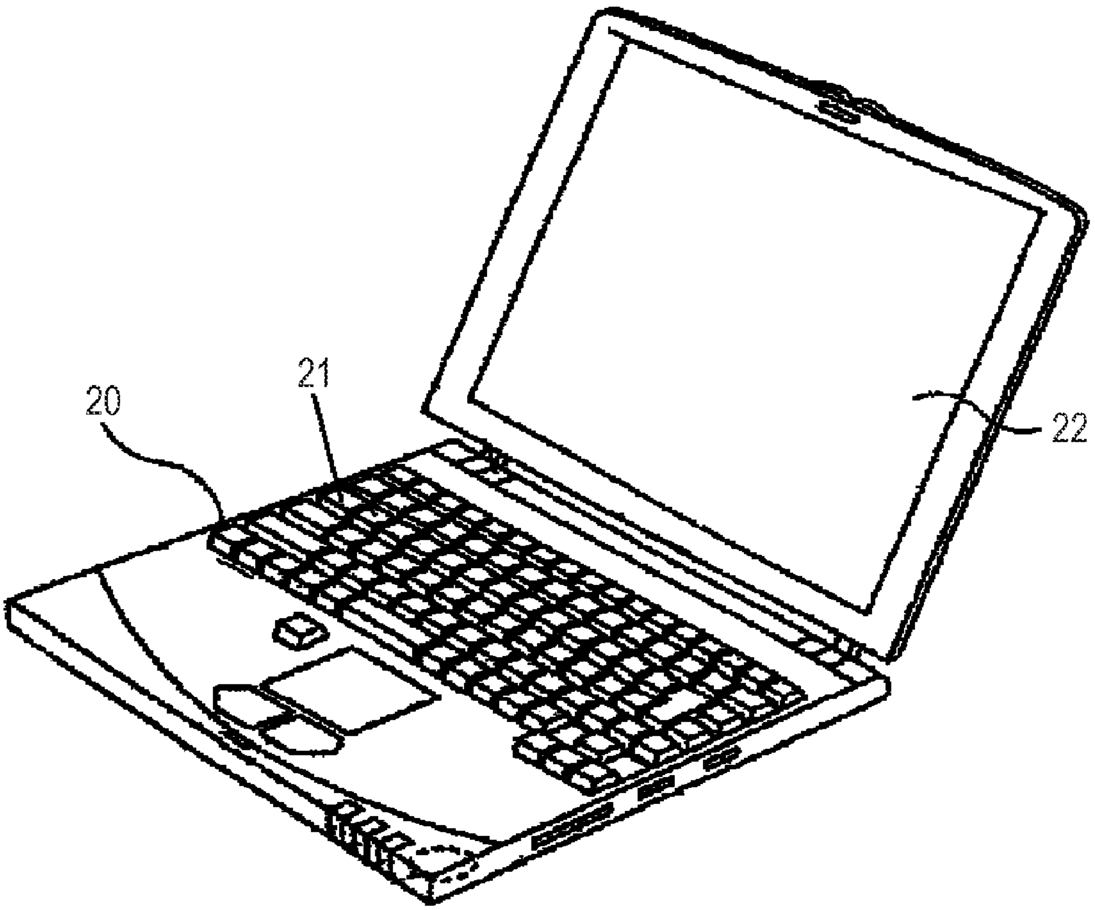
FIG. 18 is a perspective view showing a notebook type personal computer according to the second embodiment of the invention.

FIG. 18 is an example of a notebook type personal computer according to the second embodiment of the invention. This notebook type personal computer is a notebook type personal computer to which the first embodiment of the invention is applied. The notebook type personal computer includes, in a main body 20, a keyboard 21 which is operated when a user inputs characters and the like, and also includes, in a main body cover, a display unit 22 which displays an image. The notebook type personal computer is manufactured by using the display apparatus according to the first embodiment of the invention for the display unit 22.

Figure 19:
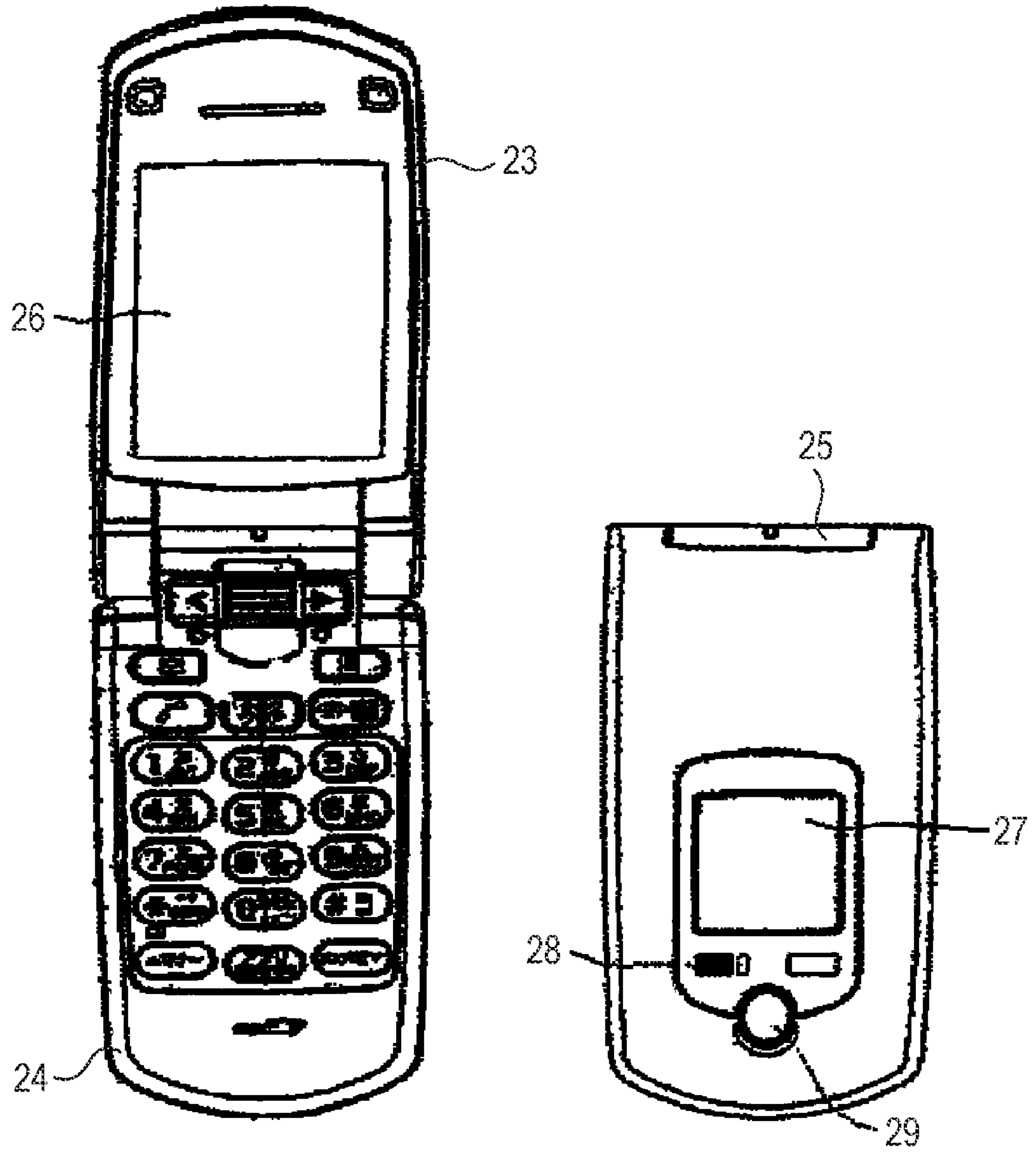
FIG. 19 is a schematic view showing a mobile terminal according to the second embodiment of the invention.

FIG. 19 is an example of a mobile terminal according to the second embodiment of the invention. This mobile terminal is a mobile terminal to which the first embodiment of the invention is applied. Here, the left portion shows a state where the mobile terminal is unfolded, and the right portion shows a state where the mobile terminal is folded. The mobile terminal includes an upper housing 23, a lower housing 24, a connection unit (in this case, a hinge) 25, a display 26, a sub-display 27, a picture light 28, a camera 29, and the like. The mobile terminal is manufactured by using the display apparatus according to the first embodiment of the invention for the display 26 or the sub-display 27.

Figure 20:
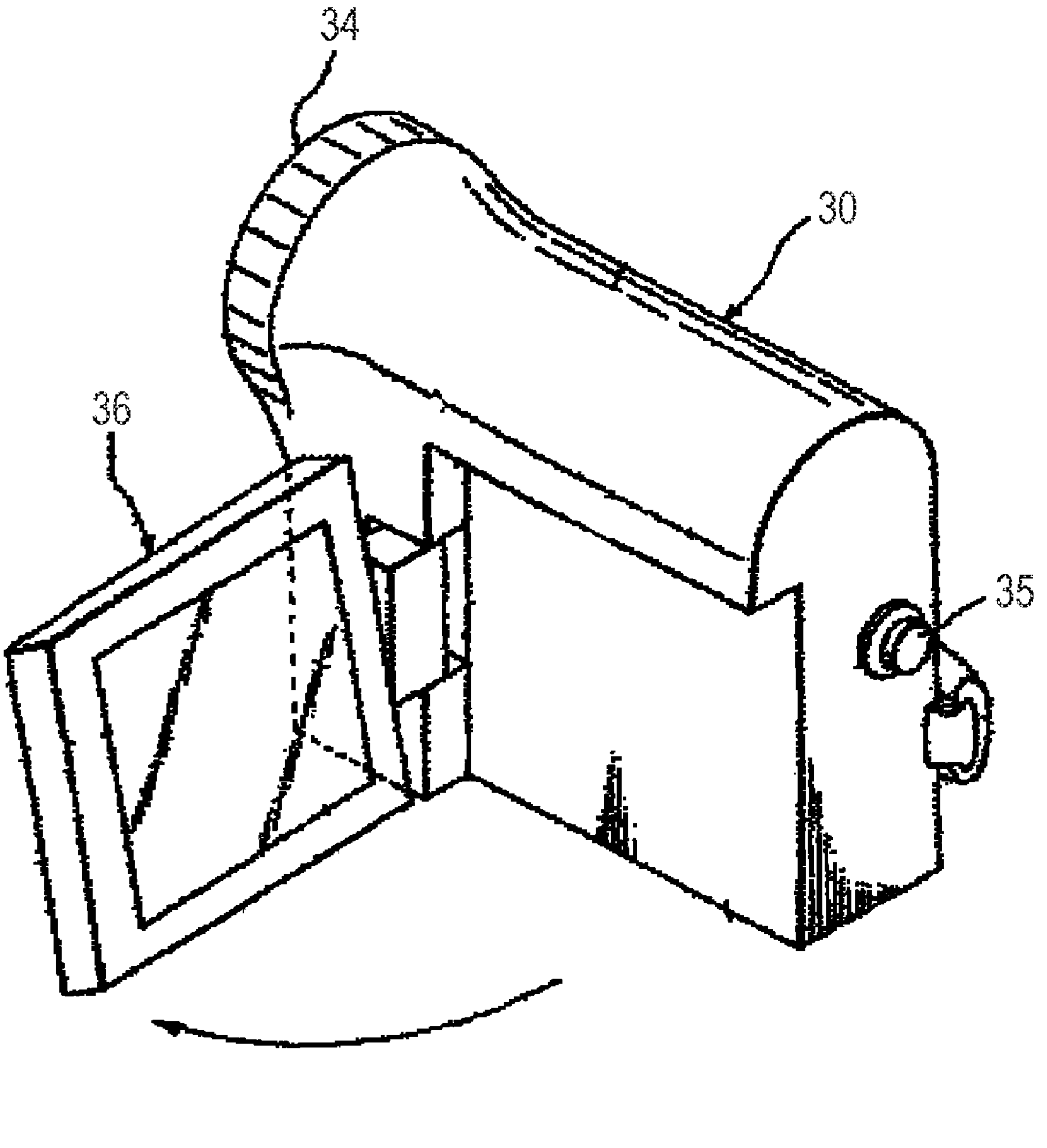
FIG. 20 is a perspective view showing a video camera according to the second embodiment of the invention.

FIG. 20 shows an example of a video camera according to the second embodiment of the invention. The video camera is a video camera to which the first embodiment of the invention is applied. The video camera includes a main body unit 30, a lens 34 for photographing a subject at a forward side surface, a start/stop switch 35 at the time of photographing, a monitor 36, and the like, and is manufactured by using the display apparatus according to the first embodiment of the invention for the monitor 36.

The embodiments of the invention are for illustration of an example for carrying out the invention, and have correspondence to the invention-specifying matters in the claims as described above. It should be noted that the invention is not limited to the embodiments, and various modifications may be made without departing from the subject matter of the invention.

The present application contains subject matter related to that disclosed in Japanese Priority Patent Application JP 2009-073977 filed in the Japan Patent Office on Mar. 25, 2009, the entire contents of which is hereby incorporated by reference.

What is claimed is:

1. A display apparatus comprising:

a plurality of pixel circuits; and a signal supply circuit which supplies any one of a potential of a video signal, an extinction potential for extinguishing light-emitting devices, a reference potential lower than the extinction potential, and a high-level potential higher than the extinction potential, wherein, the pixel circuits are driven in an extinction period, a threshold correction period and a light-emission period; and each of the plurality of pixel circuits includes a storage capacitor which retains a voltage corresponding to the video signal, a drive transistor which supplies a current based on the voltage retained in the storage capacitor to the corresponding light-emitting device, a light-emitting device which emits light in accordance with the current supplied from the drive transistor, and a write transistor connected to receive each of the potential of a video signal, the extinction potential for extinguishing light-emitting devices, the reference potential, and the high-level potential higher than the extinction potential, and which writes the voltage corresponding to the video signal to the storage capacitor after supplying the high-level potential and the extinction potential during the extinction period and the reference potential during the threshold correction period, in that order, to a gate of the drive transistor.

2. The display apparatus according to claim 1, further comprising:

a power supply circuit which supplies the same power supply potentials to the plurality of pixel circuits for every plural number of rows, wherein the drive transistor supplies to the light-emitting device the current based on the voltage retained in the storage capacitor by receiving the power supply potential.

3. The display apparatus according to claim 1, wherein the signal supply circuit supplies the high-level potential within the range of the potential of the video signal.

4. The display apparatus according to claim 3, wherein the signal supply circuit supplies the high-level potential within the range lower than half of the range of the potential of the video signal.

5. The display apparatus according to claim 1, wherein the light-emitting devices are organic electroluminescence devices.

6. An electronic instrument comprising:

a plurality of pixel circuits; and a signal supply circuit which supplies any one of a potential of a video signal, an extinction potential for extinguishing a light-emitting device, a reference potential lower than the extinction potential and a high-level potential higher than the extinction potential, wherein, the pixel circuits are driven in an extinction period, a threshold correction period and a light-emission period; and each of the plurality of pixel circuits includes a storage capacitor which retains a voltage corresponding to the video signal, a drive transistor which supplies a current based on the voltage retained in the storage capacitor to the corresponding light-emitting device, a light-emitting device which emits light in accordance with the current supplied from the drive transistor, and a write transistor connected to receive each of the potential of a video signal, the extinction potential for extinguishing light-emitting devices, the reference potential, and the high-level potential higher than the extinction potential, and which writes the voltage corresponding to the video signal to the storage capacitor during a current horizontal scan period after supplying the high-level potential and the extinction potential during the extinction period and the reference potential during the threshold correction period, in that order to a gate of the drive transistor.

* * * * *